(12) United States Patent
Zhang et al.

(10) Patent No.: US 11,477,437 B2
(45) Date of Patent: Oct. 18, 2022

(54) CODING OF MOTION INFORMATION

(71) Applicant: Lemon Inc., Grand Cayman (KY)

(72) Inventors: Na Zhang, Beijing (CN); Kai Zhang, Los Angeles, CA (US); Li Zhang, Los Angeles, CA (US); Hongbin Liu, Beijing (CN); Yuwen He, Los Angeles, CA (US); Yue Wang, Beijing (CN)

(73) Assignee: Lemon Inc., Grand Cayman (KY)

(*) Notice: Subject to any disclaimer, the term of this patent is extended or adjusted under 35 U.S.C. 154(b) by 0 days.

(21) Appl. No.: 17/161,335

(22) Filed: Jan. 28, 2021

(65) Prior Publication Data

US 2022/0239899 A1 Jul. 28, 2022

(51) Int. Cl.
*H04N 19/105* (2014.01)
*H04N 19/132* (2014.01)
*H04N 19/176* (2014.01)
*H04N 19/186* (2014.01)
*H04N 19/46* (2014.01)

(52) U.S. Cl.
CPC ......... *H04N 19/105* (2014.11); *H04N 19/132* (2014.11); *H04N 19/176* (2014.11); *H04N 19/186* (2014.11); *H04N 19/46* (2014.11)

(58) Field of Classification Search
CPC ............... H04N 19/105; H04N 19/186; H04N 19/176; H04N 19/132; H04N 19/46
USPC ...................................... 375/240.02
See application file for complete search history.

(56) References Cited

U.S. PATENT DOCUMENTS

| | | | |
|---|---|---|---|
| 2013/0188715 A1* | 7/2013 | Seregin | H04N 19/61 375/240.16 |
| 2018/0376160 A1* | 12/2018 | Zhang | H04N 19/597 |
| 2020/0068218 A1* | 2/2020 | Chen | H04N 19/105 |
| 2020/0366924 A1* | 11/2020 | Rusanovskyy | H04N 19/52 |
| 2021/0160528 A1* | 5/2021 | Chen | H04N 19/513 |
| 2021/0266586 A1* | 8/2021 | Leleannec | H04N 19/176 |
| 2021/0314560 A1* | 10/2021 | Lai | H04N 19/159 |

\* cited by examiner

*Primary Examiner* — Marnie A Matt
(74) *Attorney, Agent, or Firm* — ArentFox Schiff LLP

(57) ABSTRACT

Implementations of the present disclosure provide a solution for encoding and decoding motion information. In this solution, during a conversion between a current video block of a video and a bitstream of the video, a group type of a subgroup of candidates of motion information for the current video block is determined, wherein the group type indicating whether the subgroup of candidates are to be reordered. Further, a list of candidates are constructed based on the group type; and the motion information for the current video block is derived from the list of candidates.

30 Claims, 11 Drawing Sheets

CODING OF MOTION INFORMATION

FIELD

Embodiments of the present disclosure relate generally to video encoding and decoding, and more particularly, to the coding of motion information.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding, so as to process digital video information more efficiently.

In a process of video encoding/decoding, motion compensation is used for removing temporal redundancy in a video signal. By motion compensation, a difference between an original signal and a reference signal indicated by motion information may be determined and encoded, thereby increasing a compression efficiency of video coding. Since motion information of a video block may occupy a considerable portion of a bitstream, transmission of motion information for the block is expected to be reduced in order to increase compression efficiency.

SUMMARY

Embodiments of the present disclosure provide a solution for coding motion information.

In a first aspect, a method of coding video data is provided. The method comprises: determining, during a conversion between a current video block of a video and a bitstream of the video, a group type of a subgroup of candidates of motion information for the current video block, the group type indicating whether the subgroup of candidates are to be reordered; constructing a list of candidates based on the group type; and deriving the motion information for the current video block from the list of candidates.

In some embodiments, the conversion comprises decoding the current video block from the bitstream.

In some embodiments, the group type is determined based on an index for the motion information.

In some embodiments, the index for the motion information is signaled in the bitstream if the coding mode is not one of the following coding modes: a merge mode with motion vector differences (MMVD) mode, a geometric partitioning mode (GPM), a triangle partition mode, or a sub-block based merge mode.

In some embodiments, the index for the motion information is signaled in the bitstream if at least one of the following conditions is satisfied: a height of the current video block is greater than or equal to a first threshold, a width of the current video block is greater than or equal to a second threshold, or a product of the height and the width of the current video block is greater than or equal to a third threshold.

In some embodiments, the index is decoded from the bitstream if a first flag decoded from the bitstream has a first value.

In some embodiments, determining the group type of the subgroup of candidates comprises: if a sequence number associated with the subgroup among a plurality of subgroups is greater than a threshold, determining the group type as a first type indicating that the subgroup of candidates are to be reordered; or if a sequence number associated with the subgroup among the plurality of subgroups is less than or equal to the threshold, determining the group type as a second type indicating that the subgroup of candidates are not to be reordered.

In some embodiments, a size of at least one of the plurality of subgroups is determined based on at least one of: a number of available adjacent spatial merge candidates, a number of available spatial temporal motion vector prediction (STMVP) merge candidates, a number of available temporal merge candidates, a number of available non-adjacent spatial merge candidates, a number of available HMVP merge candidates, or a number of available pair-wise average merge candidates.

In some embodiments, a second flag indicating the group type is signaled in the bitstream.

In some embodiments, constructing the list of candidates comprises: if the group type indicates that the subgroup of candidates are to be reordered, reordering the subgroup of candidates to obtain a reordered subgroup; and constructing the list of candidates based on the reordered subgroup.

In some embodiments, the subgroup of candidates are reordered based on a template matching cost associated with each of the subgroup of candidates, the template matching cost being determined based on a first difference between a set of neighboring samples of the current video block and a set of reference samples corresponding to the set of neighboring samples, the set of reference samples being determined based on motion information indicated by a respective candidate.

In some embodiments, the set of neighboring samples only comprise samples of the luminance component.

In some embodiments, a shape of the set of neighboring samples is determined based on a shape of the current video block.

In some embodiments, the first difference is determined based on a down-sampled version of the set of neighboring samples and a down-sampled version of the set of reference samples.

In some embodiments, the motion information comprises a motion vector, and wherein the motion vector is adjusted to integer pixel accuracy for determining the set of reference samples.

In some embodiments, the set of reference samples are determined based on one of: a 2-tap interpolation process, a 4-tap interpolation process, a 6-tap interpolation process or 8-tap interpolation process.

In some embodiments, the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

In some embodiments, the first set of reference samples are associated with a first weight and the second set of reference samples are associated with a second weight, and wherein at least one of the first weight and the second weight is determined according to a Bi-prediction with CU-level weight (BCW) index associated with the respective candidate.

In some embodiments, wherein a Local Illumination Compensation (LIC) method is utilized for determining the set of reference samples if a LIC flag associated with the respective candidate is true.

In some embodiments, wherein the first difference comprises at least one of: a sum of absolute differences (SAD), a sum of absolute transformed differences (SATD), a sum of squared differences (SSD), a weighted SAD, a weighted SATD, or a weighted SSD.

In some embodiments, the template matching cost is determined further based on a second difference between a set of reconstructed samples neighboring to the set of neighboring samples and the set of reference samples.

In some embodiments, the second difference comprises at least one of: a sum of absolute differences (SAD), a sum of absolute transformed differences (SATD), a sum of squared differences (SSD), a weighted SAD, a weighted SATD, or a weighted SSD.

In some embodiments, the template matching cost comprises a weighted sum of the first difference and the second difference.

In some embodiments, at least one of a third weight associated with the first difference and a fourth weight associated with the second difference is obtained from the bitstream.

In some embodiments, at least one of the following candidates is not be reordered during the reordering the subgroup of candidates: a uni-prediction sub-block based merge candidate, a subblock-based temporal motion vector prediction (SbTMVP) candidate, a constructed affine candidate, or a zero padding affine candidate.

In some embodiments, if the subgroup of candidates comprise a first candidate associated with a block above the current video block and a second candidate associated with a block on the left of the current video block, the first candidate and the second candidate are reordered according to a comparison between a height and a width of the current video block during the reordering the subgroup of candidates.

In some embodiments, constructing the list of candidates based on the group type comprises: if the group type indicates that the subgroup of candidates are to be reordered, constructing the list of candidates based on the index such that all of the subgroup of candidates are included in the list of candidates.

In some embodiments, constructing the list of candidates based on the group type comprising: if the group type indicates that the subgroup of candidates are not to be reordered, constructing the list of candidates according to a predetermined order based on the index.

In some embodiments, the conversion comprises encoding the current video block into the bitstream.

By grouping the candidates for determining motion information into a plurality of subgroups and adaptively reordering some of the subgroups, the embodiments according to the present disclosure may help reduce the transmission overhead for the motion information, thereby improving the efficiency for video encoding and/or decoding.

In a second aspect, a method of reordering merge candidates is provided. The method comprises: determining, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and reordering the plurality of candidates of motion information based on the template matching cost.

In some embodiments, the set of neighboring samples only comprise samples of the luminance component.

In some embodiments, a shape of the set of neighboring samples is determined based on a shape of the current video block.

In some embodiments, the first difference is determined based on a down-sampled version of the set of neighboring samples and a down-sampled version of the set of reference samples.

In some embodiments, the motion information comprises a motion vector, and wherein the motion vector is adjusted to integer pixel accuracy for determining the set of reference samples.

In some embodiments, the set of reference samples are determined based on one of: a 2-tap interpolation process, a 4-tap interpolation process, a 6-tap interpolation process or 8-tap interpolation process.

In some embodiments, the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

In some embodiments, the first set of reference samples are associated with a first weight and the second set of reference samples are associated with a second weight, and wherein at least one of the first weight and the second weight is determined according to a Bi-prediction with CU-level weight (BCW) index associated with the respective candidate.

In some embodiments, a Local Illumination Compensation (LIC) method is utilized for determining the set of reference samples if a LIC flag associated with the respective candidate is true.

In some embodiments, the first difference comprises at least one of: a sum of absolute differences (SAD), a sum of absolute transformed differences (SATD), a sum of squared differences (SSD), a weighted SAD, a weighted SATD, or a weighted SSD.

In some embodiments, the template matching cost is determined further based on a second difference between a set of reconstructed samples neighboring to the set of neighboring samples and the set of reference samples.

In some embodiments, the second difference comprises at least one of: a sum of absolute differences (SAD), a sum of absolute transformed differences (SATD), a sum of squared differences (SSD), a weighted SAD, a weighted SATD, or a weighted SSD.

In some embodiments, the template matching cost comprises a weighted sum of the first difference and the second difference.

In some embodiments, at least one of a third weight associated with the first difference and a fourth weight associated with the second difference is obtained from the bitstream.

In a third aspect, a method of reordering merge candidates is provided. The method comprises: determining, during a conversion between a current video block of a video and a bitstream of the video, a height and a width of the current video block; and reordering a first candidate and a second candidate in a merge candidate list according to a comparison between a height and a width of the current video block, wherein the first candidate is associated with a block above the current video block and a second candidate is associated with a block on the left of the current video block.

In a fourth aspect, a method of determining cost associated with a merge candidate is provided. The method comprises: determining, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and determining a cost associated with the candidate based on the first difference.

In some embodiments, the set of neighboring samples only comprise samples of the luminance component.

In some embodiments, a shape of the set of neighboring samples is determined based on a shape of the current video block.

In some embodiments, the first difference is determined based on a down-sampled version of the set of neighboring samples and a down-sampled version of the set of reference samples.

In some embodiments, the motion information comprises a motion vector, and wherein the motion vector is adjusted to integer pixel accuracy for determining the set of reference samples.

In some embodiments, the set of reference samples are determined based on one of: a 2-tap interpolation process, a 4-tap interpolation process, a 6-tap interpolation process or 8-tap interpolation process.

In some embodiments, the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

In some embodiments, the first set of reference samples are associated with a first weight and the second set of reference samples are associated with a second weight, and wherein at least one of the first weight and the second weight is determined according to a Bi-prediction with CU-level weight (BCW) index associated with the respective candidate.

In some embodiments, a Local Illumination Compensation (LIC) method is utilized for determining the set of reference samples if a LIC flag associated with the respective candidate is true.

In some embodiments, the first difference comprises at least one of: a sum of absolute differences (SAD), a sum of absolute transformed differences (SATD), a sum of squared differences (SSD), a weighted SAD, a weighted SATD, or a weighted SSD.

In some embodiments, the cost is determined further based on a second difference between a set of reconstructed samples neighboring to the set of neighboring samples and the set of reference samples.

In some embodiments, the second difference comprises at least one of: a sum of absolute differences (SAD), a sum of absolute transformed differences (SATD), a sum of squared differences (SSD), a weighted SAD, a weighted SATD, or a weighted SSD.

In some embodiments, the cost comprises a weighted sum of the first difference and the second difference.

In some embodiments, at least one of a third weight associated with the first difference and a fourth weight associated with the second difference is obtained from the bitstream.

In a fifth aspect, an electronic device is provided. The device comprises: a processing unit; and a memory coupled to the processing unit and having instructions stored thereon which, when executed by the processing unit, cause the electronic device to perform the method according to: determine, during a conversion between a current video block of a video and a bitstream of the video, a group type of a subgroup of candidates of motion information for the current video block, the group type indicating whether the subgroup of candidates are to be reordered; construct a list of candidates based on the group type; and derive the motion information for the current video block from the list of candidates.

In a sixth aspect, an electronic device is provided. The device comprises: a processing unit; and a memory coupled to the processing unit and having instructions stored thereon which, when executed by the processing unit, cause the electronic device to perform the method according to: determine, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and reorder the plurality of candidates of motion information based on the template matching cost.

In a seventh aspect, an electronic device is provided. The device comprises a processing unit; and a memory coupled to the processing unit and having instructions stored thereon which, when executed by the processing unit, cause the electronic device to perform the method according to: determine, during a conversion between a current video block of a video and a bitstream of the video, a height and a width of the current video block; and reorder a first candidate and a second candidate in a merge candidate list according to a comparison between a height and a width of the current video block, wherein the first candidate is associated with a block above the current video block and a second candidate is associated with a block on the left of the current video block.

In an eighth aspect, an electronic device is provided. The device comprises a processing unit; and a memory coupled to the processing unit and having instructions stored thereon which, when executed by the processing unit, cause the electronic device to perform the method according to: determine, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and determine a cost associated with the candidate based on the first difference.

In a ninth aspect, a non-transitory computer-readable storage medium is provided. The non-transitory computer-readable storage medium stores instructions that cause a processor to: determine, during a conversion between a current video block of a video and a bitstream of the video, a group type of a subgroup of candidates of motion information for the current video block, the group type indicating whether the subgroup of candidates are to be reordered; construct a list of candidates based on the group type; and derive the motion information for the current video block from the list of candidates.

In a tenth aspect, a non-transitory computer-readable storage medium is provided. The non-transitory computer-readable storage medium stores instructions that cause a processor to: determine, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and reorder the plurality of candidates of motion information based on the template matching cost.

In an eleventh aspect, a non-transitory computer-readable storage medium is provided. The non-transitory computer-readable storage medium stores instructions that cause a processor to: determine, during a conversion between a current video block of a video and a bitstream of the video, a height and a width of the current video block; and reorder a first candidate and a second candidate in a merge candidate list according to a comparison between a height and a width of the current video block, wherein the first candidate is associated with a block above the current video block and a second candidate is associated with a block on the left of the current video block.

In a twelfth aspect, a non-transitory computer-readable storage medium is provided. The non-transitory computer-readable storage medium stores instructions that cause a processor to: determine during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and determine a cost associated with the candidate based on the first difference.

In a thirteenth aspect, a non-transitory computer-readable recording medium is provided. The non-transitory computer-readable recording medium stores a bitstream of a video which is generated by a method performed by a video processing apparatus, wherein the method comprises: determining, during a conversion between a current video block of a video and a bitstream of the video, a group type of a subgroup of candidates of motion information for the current video block, the group type indicating whether the subgroup of candidates are to be reordered; constructing a list of candidates based on the group type; and deriving the motion information for the current video block from the list of candidates.

In a fourteenth aspect, a non-transitory computer-readable recording medium is provided. The non-transitory computer-readable recording medium stores a bitstream of a video which is generated by a method performed by a video processing apparatus, wherein the method comprises: determining, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and reordering the plurality of candidates of motion information based on the template matching cost.

In a fifteenth aspect, a non-transitory computer-readable recording medium is provided. The non-transitory computer-readable recording medium stores a bitstream of a video which is generated by a method performed by a video processing apparatus, wherein the method comprises: determining, during a conversion between a current video block of a video and a bitstream of the video, a height and a width of the current video block; and reordering a first candidate and a second candidate in a merge candidate list according to a comparison between a height and a width of the current video block, wherein the first candidate is associated with a block above the current video block and a second candidate is associated with a block on the left of the current video block.

In a sixteenth aspect, a non-transitory computer-readable recording medium is provided. The non-transitory computer-readable recording medium stores a bitstream of a video which is generated by a method performed by a video processing apparatus, wherein the method comprises: determining, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and determining a cost associated with the candidate based on the first difference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

DETAILED DESCRIPTION

Figure 1:
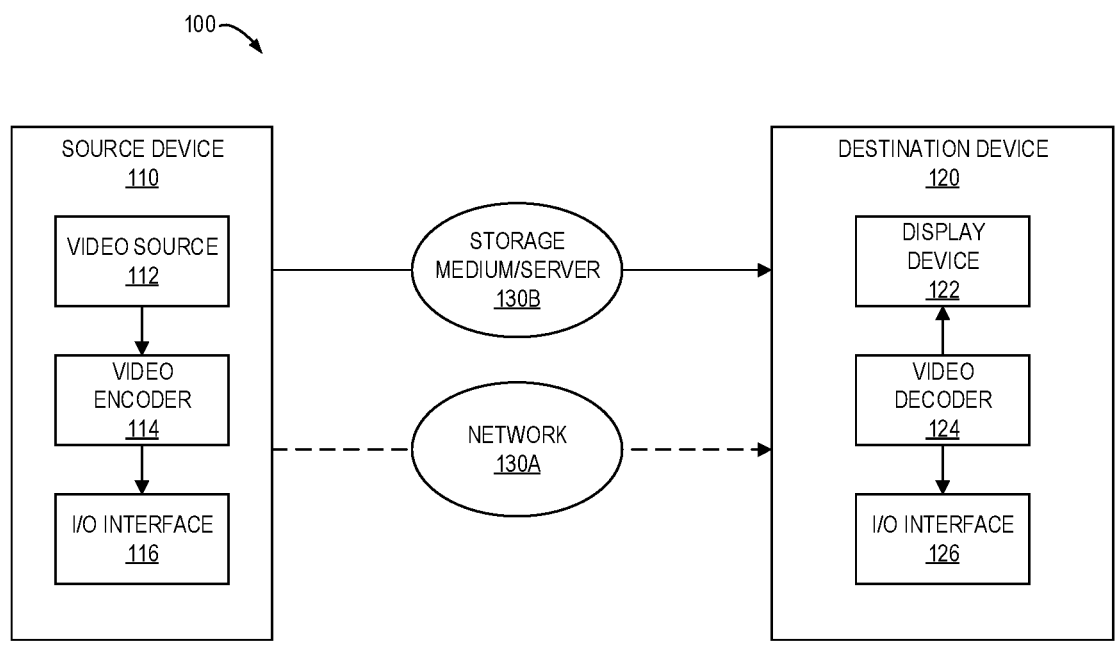
FIG. 1 is a block diagram that illustrates an example video coding system, in accordance with some embodiments of the present disclosure.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130a. The encoded video data may also be stored onto a storage medium/server 130b for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130b. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
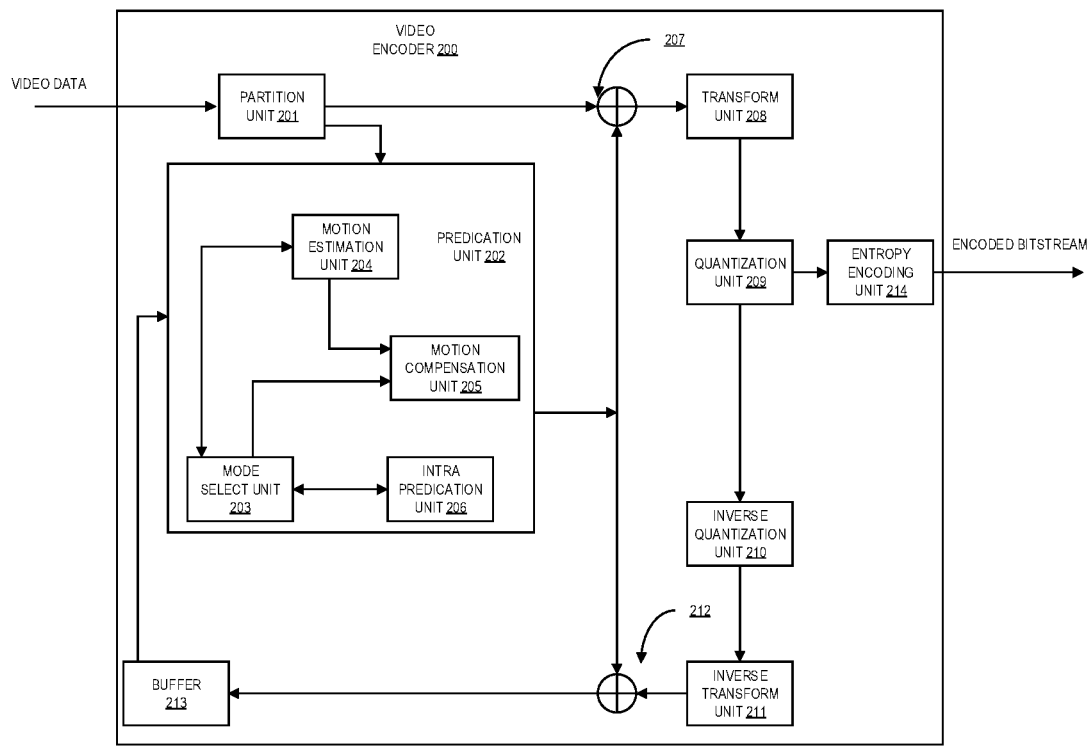
FIG. 2 is a block diagram that illustrates a first example video encoder, in accordance with some embodiments of the present disclosure.

FIG. 2 is a block diagram illustrating an example of video encoder 200, which may be an example of the video encoder 114 in the system 100 illustrated in FIG. 1, in accordance with some aspects of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some example, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
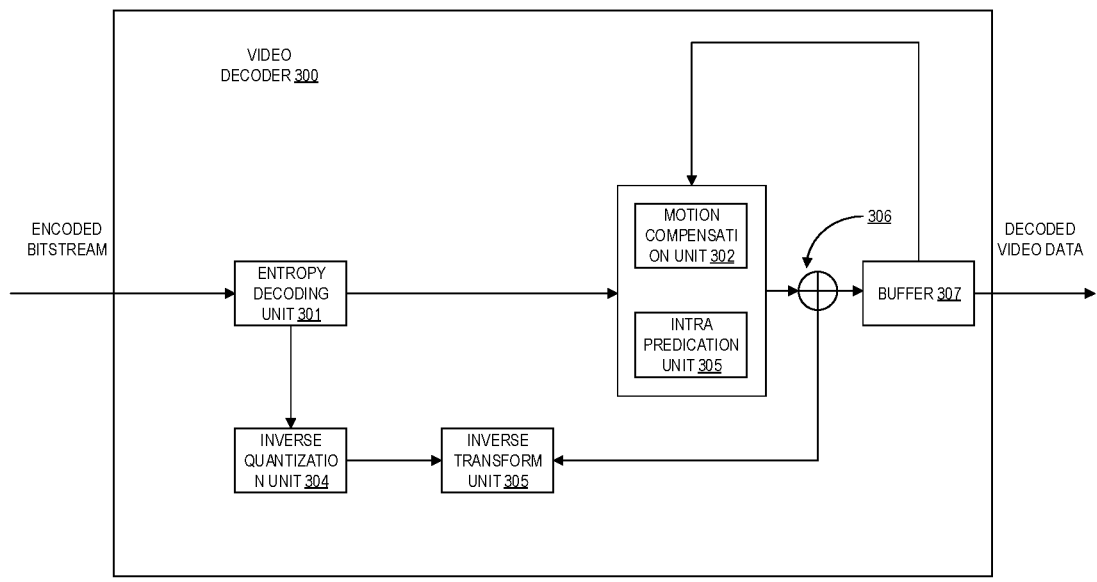
FIG. 3 is a block diagram that illustrates an example video decoder, in accordance with some embodiments of the present disclosure.

FIG. 3 is a block diagram illustrating an example of video decoder 300, which may be an example of the video decoder 124 in the system 100 illustrated in FIG. 1, in accordance with some aspects of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200 (FIG. 2).

The entropy decoding unit 301 may retrieve an encoded bitstream. The encoded bitstream may include entropy coded video data (e.g., encoded blocks of video data). The Entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by video encoder 20 during encoding of the video block to calculate interpolated values for sub-integer pixels of a reference block. The motion compensation unit 302 may determine the interpolation filters used by video encoder 200 according to the received syntax information and use the interpolation filters to produce predictive blocks.

The motion compensation unit 302 may use at least part of the syntax information to determine sizes of blocks used to encode frame (s) and/or slice (s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 303 inverse quantizes, i.e., de-quantizes, the quantized video block coefficients provided in the bitstream and decoded by entropy decoding unit 301. Inverse transform unit 303 applies an inverse transform.

The reconstruction unit 306 may obtain the decoded blocks, e.g., by sum the residual blocks with the corresponding prediction blocks generated by motion compensation unit 202 or intra-prediction unit 303. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Although the following description may be focused on High Efficiency Video Coding (HEVC), and/or the standard Versatile Video Coding (VVC), the concepts described herein may be applicable to other coding standards or video codec.

Coding of Motion Information

As discussed above, motion information for a current video block may be generated by a motion estimation unit, for example by comparing one or more reference frames to the current video block. In recent years, to further reduce the transmission overhead for the motion information, a merge mode has been proposed for encoding the motion information.

In the merge mode, a merge candidate list may be constructed, which may comprise a predetermined number of candidates (also referred to as merge candidates). Each merge candidate may comprise motion information determined according to a particular method. For example, in the VVC standard, the following five types of merge candidates may be considered in sequence for constructing the merge candidate list: spatial motion vector prediction (MVP) from spatial neighbor coding units (CUs), temporal MVP from collocated CUs, history-based MVP from a first in first out (FIFO) table, pairwise average MVP, and zero motion vectors (MVs).

Further, a best candidate for the current video block may be selected from the constructed merge candidate list, and an index (also referred to as merge index) for the best merge candidate in the list may be encoded into the bitstream. The index herein may indicate a position of the selected candidate in the merge candidate list. In this regard, the motion information itself (e.g., a motion vector) for the current video block may not need to be encoded and transmitted, thereby reducing the transmission overhead.

However, in some traditional merge modes, the order for the merge candidates in the merge candidate list is fixed. In such cases, if the selected best merge candidate is located at the latter part of the list, the index would have a larger value and then may require more bits for encoding.

Figure 4:
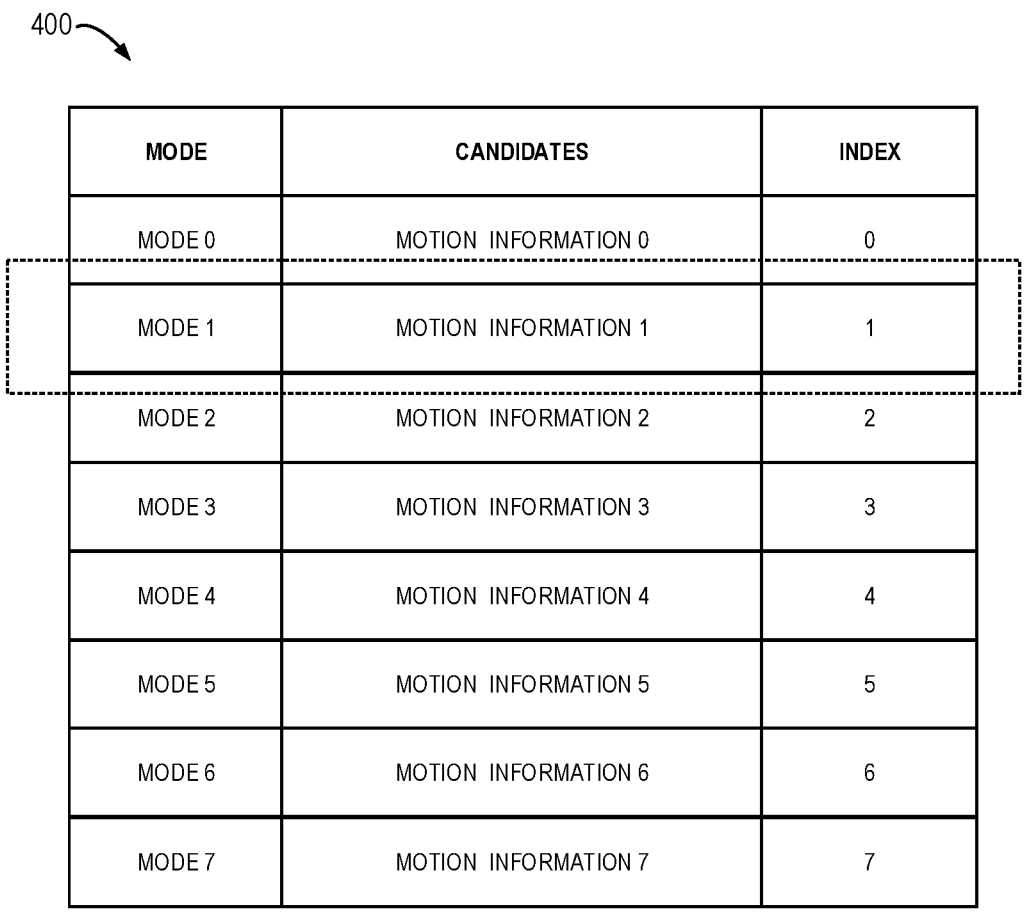
FIG. 4 illustrates an example list of merge candidates, in accordance with some embodiments of the present disclosure.

FIG. 4 illustrates an example list 400 of merge candidates, in accordance with some embodiments of the present disclosure. As shown in FIG. 4, eight merge candidates are included in the candidate list 400. A mode for a candidate may indicate how this candidate is constructed. For example, "mode 0" may indicate that the candidate is associated with a $B_0$ position of the current video block.

Further, a best merge candidate may be selected from the eight candidates, and an index of the best merge candidate may then be encoded into a bitstream. For example, the index may be encoded using truncated unary binarization (TU). In this way, a value of the index may be encoded into a bin string. For example, an index "0" may be encoded as a bin string "1", an index "1" may be encoded as a bin string "01", and an index "6" may be encode as a bin string "0000001". It can be clearly seen that, if an index for the selected best candidate has a larger value, e.g., "6", much more bits are required as compared to an index with a less value, e.g., "0".

Some methods for improving the encoding of the index have been proposed recently. For example, a template matching based adaptive merge candidate reorder solution is proposed In JVET-K0143. In that solution, the merge candidate list is divided into multiple subgroups, and the candidates in each subgroup are to be reordered based on a template matching cost for each candidate. However, the reordering of the merge candidates lead to the increase of the complexity for video encoding and decoding. Therefore, the balance between the increase of complexity of encoding/decoding and the improvement for the transmission efficiency need to be further considered.

According to embodiments of the subject matter described herein, a solution for video encoding is proposed. In this solution, during a conversion between a current video block of a video and a bitstream of the video, a group type of a subgroup of candidates of motion information for the current video block is determined, wherein the group type indicating whether the subgroup of candidates are to be reordered. Further, a list of candidates are constructed based on the group type; and the motion information for the current video block is derived from the list of candidates.

Encoding of Motion Information

In a first aspect, according to embodiments of the subject matter described herein, a solution for video encoding is proposed. In this solution, a plurality of candidates for determining motion information associated with a current video block are constructed and then divided into multiple subgroups of candidates. Further, a list of candidates is constructed by reordering at least one of the multiple of subgroups, and the motion information is then selected from the list of candidates. Further, an index for the motion information is then encoded into a bitstream.

The basic principles and several example embodiments of the subject matter described herein are described below with reference to the figures.

Figure 5:
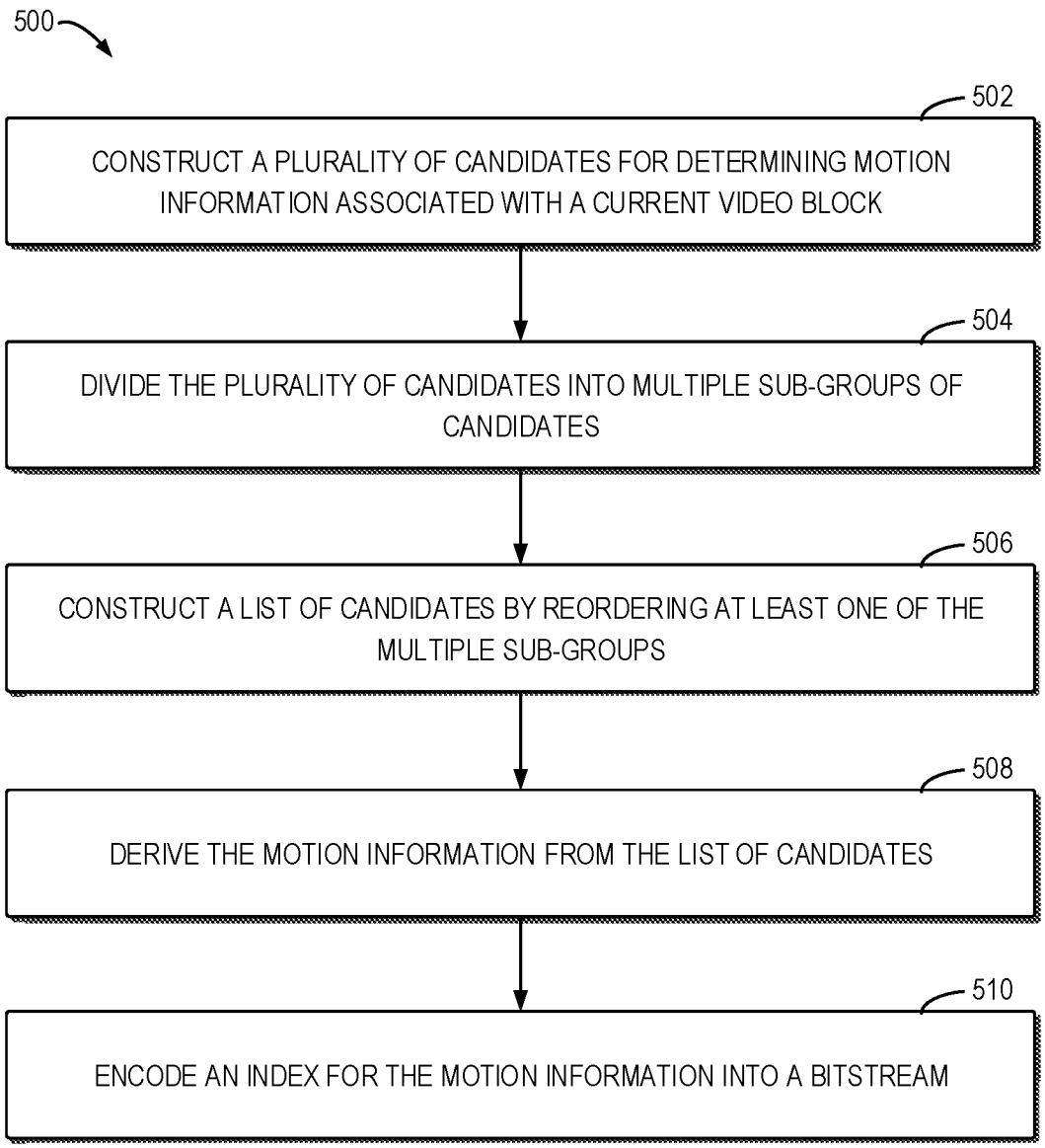
FIG. 5 illustrates a flowchart of a process of encoding motion information in accordance with some embodiments of the present disclosure.

FIG. 5 illustrates a flowchart of a process 500 of encoding motion information according to some embodiments of the subject matter as described herein. The process 500 may be implemented by the video encoder 200 in FIG. 2.

As shown in FIG. 5, at block 502, the video encoder 200 constructs a plurality of candidates for determining motion information associated with a current video block.

As discussed above, upon encoding the motion information for a current video block, the video encoder 200 may first construct a plurality of candidates (also referred to as an initial list of candidates). For example, in the VVC standard, the video encoder 200 may construct a plurality of candidates according to the order below: Spatial MVP from spatial neighbour CUs, Temporal MVP from collocated CUs, History-based MVP from an FIFO table, Pairwise average MVP and Zero MVs. In some examples, a maximum number of the plurality of candidates may be set as a fixed number. For example, in the VVC standard, the maximum number is set as less than or equal to six.

It should be understood that, if a video coding standard is changed, a different number of candidates and/or different types of candidates may be constructed. The present disclosure is not aimed to be limited in this regard, and any proper methods for constructing the plurality of candidates may be utilized.

In above examples, the candidate(s) included in the plurality of candidates may comprise a candidate after pruning, i.e., a candidate in the final candidate list. Alternatively, the candidate(s) included in the initial list of candidates may comprise a candidate derived from a given spatial or temporal block or HMVP table or with other ways even if it may not be included in the final merge candidate list.

At block 504, the video encoder 200 divides the plurality of candidates into multiple subgroups of candidates.

In some embodiments, the video encoder 200 may first determine whether the initial list of candidates are to be divided into subgroups. In some embodiments, the video encoder 200 may determine whether the initial list of candidates are to be divided based on a coding mode for the current video block.

For example, if the coding mode is not one of: a merge mode with motion vector differences (MMVD) mode, a geometric partitioning mode (GPM), a triangle partition mode and a sub-block based merge mode, the video encoder 200 may determine that the initial list of candidates are to be divided into subgroups.

Alternatively or additionally, the video encoder 200 may determine that the initial list of candidates are to be divided into subgroups if the coding mode indicates other types of merge mode, e.g., a regular merge mode, a Combined inter and intra prediction (CCIP) mode, or a sub-block based merge mode.

In some embodiments, if the coding mode is a sub-block based merge mode, partial or full sub-block based merge candidates may be reordered. Alternatively, the particular reordering method for sub-block based merge mode may be different from other merge modes In some embodiments, for the sub-block based merge mode, the uni-prediction sub-block based merge candidate(s) is not reordered. Alternatively or additionally, the sub-block based temporal motion vector prediction (SbTMVP) candidate(s) is not reordered. Alternatively or additionally, the constructed affine candidate(s) is not reordered. Alternatively or additionally, the zero padding affine candidate(s) is not reordered.

In some embodiments, the video encoder 200 may also determine whether the initial list of candidates are to be divided into subgroups based on a size of the current video block.

In some embodiments, if a height of the current video block is greater than or equal to a first threshold, the video encoder 200 may determine that the initial list of candidates are to be divided into subgroups. For example, if a height of the current video block is greater than or equal to 8, the video encoder 200 may determine that the initial list of candidates are to be divided into subgroups.

In some other embodiments, if a width of the current video block is greater than or equal to a second threshold, the video encoder 200 may determine that the initial list of candidates are to be divided into subgroups. For example, if a width of the current video block is greater than or equal to 8, the video encoder 200 may determine that the initial list of candidates are to be divided into subgroups.

In some further embodiments, if a product of a height and a width of the current video block is greater than or equal to a third threshold, the video encoder 200 may determine that the group of candidates are to be divided into subgroups. For example, if the product is greater than or equal to 128, the video encoder 200 may determine that the initial list of candidates are to be divided into subgroups.

In some further embodiments, the video encoder 200 may determine that the initial list of candidates are to be divided into subgroups if two or more of the above discussed conditions are satisfied. For example, if both a height and a width of the current video block are greater or equal to 8, the video encoder 200 may determine that the initial list of candidates are to be divided into subgroups.

In some embodiments, the video encoder 200 may also determine whether the initial list of candidates are to be divided into subgroups based on at least one of: a number of available adjacent spatial merge candidates, a number of available spatial temporal motion vector prediction (STMVP) merge candidates, a number of available temporal merge candidates, a number of available non-adjacent spatial merge candidates, a number of available HMVP merge candidates, or a number of available pair-wise average merge candidates.

For example, if a sum of those numbers is greater than a threshold, the video encoder 200 may determine that the initial list of candidates are to be divided into subgroups. Otherwise, the video encoder 200 may determine that the initial list of candidates are not to be divided into subgroups. In one example, the threshold may be set as 1.

In some further embodiments, a value of the threshold may be encoded into the bitstream. Alternatively, the threshold may be a parameter shared between the video encoder and a corresponding video decoder.

In accordance with a determination that the initial list of candidates are to be divided into subgroups, the video encoder 200 may divide the initial list of candidates into multiple subgroups of candidates according to predefined grouping rules.

In some embodiments, a number of the subgroups and a size of each subgroup (i.e., a number of candidates included in the subgroup) may be predefined. For example, it may be predefined that the first N (N≥2) candidates may be grouped into a first subgroup, the following M (M≥2) candidates may be grouped into a second subgroup, and the remaining candidates may be grouped into a third subgroup.

In some further embodiments, a size of a subgroup may also be adaptively determined. For example, the initial list of candidates may be always divided into two subgroups. A size of the first subgroup may be determined based on at least one of: a number of available adjacent spatial merge candidates, a number of available spatial temporal motion vector prediction (STMVP) merge candidates, a number of available temporal merge candidates, a number of available non-adjacent spatial merge candidates, a number of available HMVP merge candidates, or a number of available pair-wise average merge candidates.

For example, the available number of adjacent spatial merge candidates and/or STMVP merge candidates and/or temporal merge candidates is denoted as X. If X is less than a threshold number Y, then a size of the first subgroup may be set as X. Otherwise, the size of the first subgroup may be set as the threshold number Y.

In some embodiments, a value of the threshold number Y may be encoded into the bitstream. Alternatively, the threshold number Y may be a parameter shared between the video encoder and the corresponding video decoder.

Figure 6:
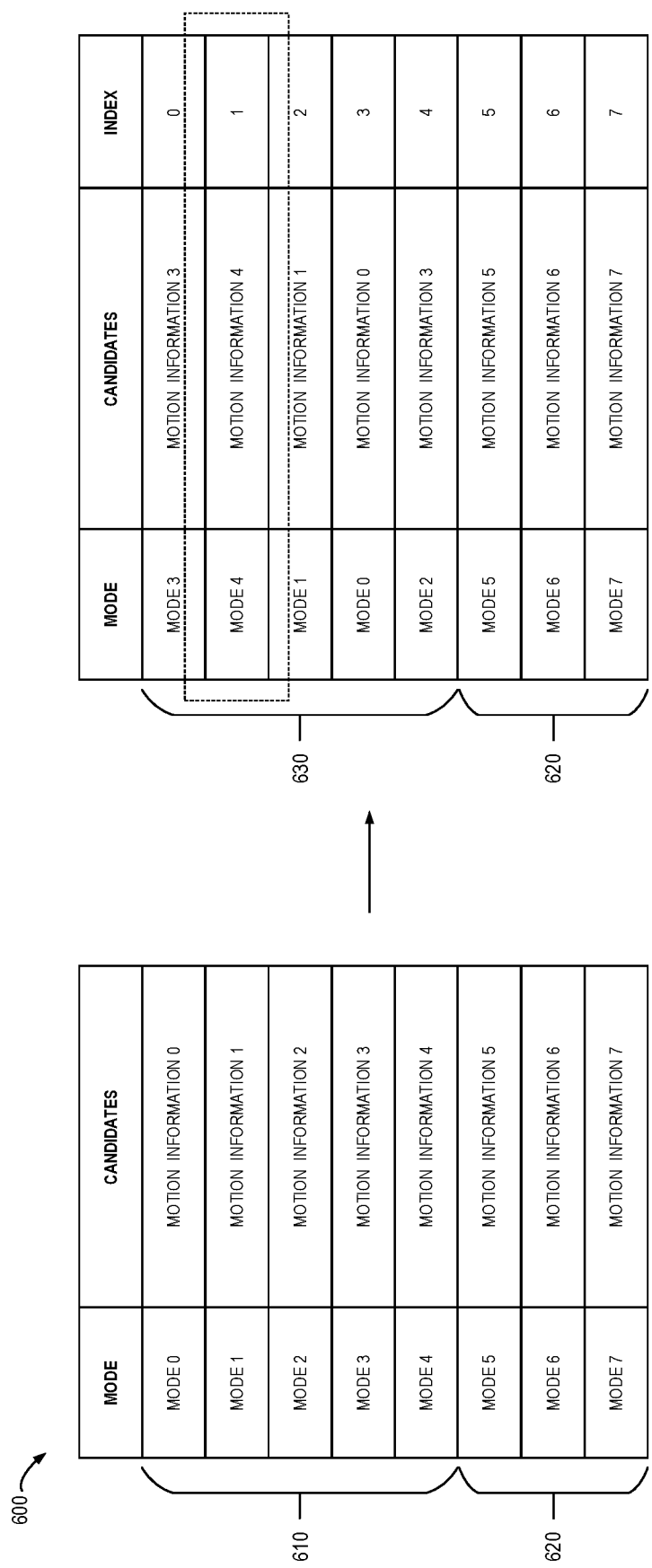
FIG. 6 illustrates a schematic diagram of encoding motion information in accordance with some embodiments of the present disclosure.

FIG. 6 illustrated a schematic diagram 600 of encoding motion information in accordance with some embodiments of the present disclosure. As shown in the example of FIG. 6, the eight candidates are grouped into two subgroups 610 and 620, wherein the first subgroup 610 comprises the first five candidates and the second subgroup 620 comprises the remaining three candidates.

Referring back to FIG. 5, at block 506, the video encoder 200 construct a list of candidates (also referred to as a final list of candidate) by reordering at least one of the multiple subgroups.

In some embodiments, the video encoder may first determine whether a subgroup is to be reordered according to predefined criterions.

In some embodiments, whether a subgroup is to be reordered may be determined based on a sequence number of the subgroup among the multiple subgroups. The sequence number could indicate a relative constructing order for the candidates included in the respective subgroup. In the example of FIG. 6, the sequence number of the first subgroup 610 may be determined as "1", and the sequence number of the second subgroup 620 may be determined as "2".

In some embodiments, the video encoder 200 may determine whether a subgroup is to be reordered based on a comparison between the sequence number and a threshold. For example, if the sequence number is less than or equal to the threshold, the subgroup may be determined to be reordered. Otherwise, the subgroup is determined not to be reordered. Continuing with the example in FIG. 6, the threshold may be set as "1", and it may then be determined that the first subgroup 610 is to be reordered, and the second subgroup 620 is not be reordered.

In some embodiments, a value of the threshold may be encoded into the bitstream. Alternatively, the threshold may be a parameter shared between the video encoder and the corresponding video decoder.

It shall be noted that the threshold may be set as a different value as needed. For example, the threshold may be set such that all of the subgroups are to be reordered except the last subgroup. Alternatively, the threshold may be set such that only the first subgroup is to be reordered.

In accordance with a determination that a subgroup is to be reordered, the video encoder 200 may reorder the subgroup according to predefined criterions.

In some embodiments, the video encoder 200 may reorder the subgroup of candidates based on a comparison between a height and a width of the current video block.

In one example, the subgroup of candidates may comprise a first spatial candidate associated with a block above of the current video block and a second spatial candidate associated with a block on the left of the current video block. In this case, if a width is larger than a height of current video block, the subgroup of candidates may be reordered such that the first spatial candidate is located before the second spatial candidate in the reordered subgroup. Alternatively, if the width is smaller than the height of current video block, the subgroup of candidates may be reordered such that the first spatial candidate is located after the second spatial candidate in the reordered subgroup.

In some further embodiments, the video encoder 200 may reorder the subgroup of candidates based on a template matching cost associated with each candidate in the subgroup. The template matching cost may be determined based on a difference between a set of neighboring samples (also referred to as "template") of the current video block and a set of reference samples (also referred to as "reference template") corresponding to the set of neighboring samples. The process of determining the template matching cost will be described with reference to FIGS. 7-8.

Figure 7:
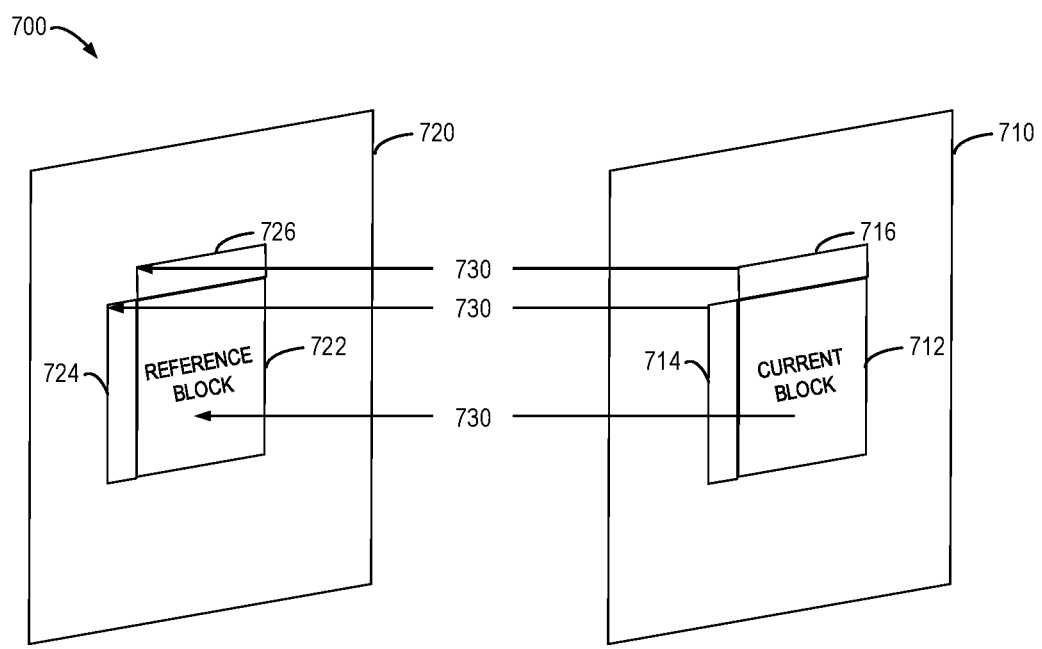
FIG. 7 illustrates a schematic diagram of determining a template matching cost in accordance with some embodiments of the present disclosure.

FIG. 7 illustrates a schematic diagram 700 of determining a template matching cost in accordance with some embodiments of the present disclosure. As shown in FIG. 7, the motion information associated with a candidate in the subgroup may be unidirectional. The video encoder 200 may first determine a set of neighboring samples of the current video block 712 in the current picture 710.

In some embodiments, the set of neighboring samples may comprise neighboring samples 714 left to the current video block 712. In some other embodiments, the set of neighboring samples may comprise neighboring samples 716 above the current video block 712. In some further embodiments, the set of neighboring samples may comprise both the neighboring samples 714 left to the current video block 712 and neighboring samples 716 above the current video block 712.

In some embodiments, a shape of the set of neighboring samples may be adaptive. For example, a shape of the set of neighboring samples may be determined according to a shape of the current video block.

In some embodiments, a shape of the neighboring samples left to the current video block may be determined based on a height of the current video block. In one example, if a height of the current video block is less than or equal to a threshold height, a shape of the neighboring samples left to the current video block may be set as w1*H, wherein H denotes the height of the current video block, and w1 is an integer. Alternatively, if a height of the current video block is great than a threshold height, a shape of the neighboring samples left to the current video block may be set as w2*H, wherein H denotes a height of the current video block, and w2 is an integer greater than w1. In a specific example, w1 may be set as "1", w2 may be set as "2", and the threshold height may be set as "8".

In some other embodiments, a shape of the neighboring samples above the current video block may be determined based on a width of the current video block. In one example, if a width of the current video block is less than or equal to a threshold width, a shape of the neighboring samples above the current video block may be set as W*h1, wherein W denotes the width of the current video block, and h1 is an integer. Alternatively, if a width of the current video block is great than a threshold width, a shape of the neighboring samples above the current video block may be set as W*h2, wherein W denotes the width of the current video block, and h2 is an integer greater than h1. In a specific example, h1 may be set as "1", h2 may be set as "2", and the threshold width may be set as "8".

In some further embodiments, a shape of the neighboring samples left to the current video block may be determined based on a width of the current video block. In one example, if a width of the current video block is less than or equal to a threshold width, a shape of the neighboring samples left to the current video block may be set as w3*H, wherein H denotes the height of the current video block, and w3 is an integer. Alternatively, if a width of the current video block is great than a threshold width, a shape of the neighboring samples left to the current video block may be set as w4*H, wherein H denotes a height of the current video block, and w4 is an integer greater than w3. In a specific example, w3 may be set as "1", w4 may be set as "2", and the threshold width may be set as "8".

In some further embodiments, a shape of the neighboring samples above the current video block may be determined based on a height of the current video block. In one example, if a height of the current video block is less than or equal to a threshold height, a shape of the neighboring samples above the current video block may be set as W*h3, wherein W denotes the width of the current video block, and h3 is an integer. Alternatively, if a height of the current video block is great than a threshold height, a shape of the neighboring samples above the current video block may be set as W*h4, wherein W denotes the width of the current video block, and h4 is an integer greater than h3. In a specific example, h3 may be set as "1", h4 may be set as "2", and the threshold height may be set as "8".

In some embodiments, the set of neighboring samples may comprise samples of specific color component(s). For example, the neighboring samples may only comprise samples of the luminance component.

Further, the video encoder 200 may determine a set of reference samples corresponding to the set of neighboring samples based on a motion vector indicated by the candidate. As shown in the example in FIG. 7, in the reference picture 720 comprising the reference block 722, the video encoder 200 may determine, using the motion vector 730, a set of reference samples 724 corresponding to the set of neighboring samples 714 and a set of reference samples 726 corresponding to the set of neighboring samples 716.

In some embodiments, to reduce the computation complexity, the motion vector 730 may be adjusted to integer pixel accuracy before being used to determine the set of reference samples. For example, a value of the motion vector may be adjusted to its nearest integer motion vector.

In some further embodiments, to reduce the computation complexity, N-tap interpolation filtering may be used to determine the set of reference samples at sub-pixel positions. For example, N may be 2, 4, or 6.

After determining the set of reference samples, the video encoder 200 may then determine a difference between the set of neighboring samples and the set of reference samples. In some embodiments, the difference may comprise a sum of absolute differences (SAD) between the set of neighboring samples and the set of reference samples. In some other embodiments, the difference may comprise a sum of absolute transformed differences (SATD) between the set of neighboring samples and the set of reference samples. In some further embodiments, the difference may comprise a sum of squared differences (SSD) between the set of neighboring samples and the set of reference samples. In some further embodiments, the difference may comprise a weighted sum of two or more of SAD, SATD and SSD.

In some embodiment, the difference may comprise a weighted SAD, wherein each sample is assigned with a corresponding weight. For example, in the set of neighboring samples, the samples which are adjacent to the current video block may be assigned with a higher weight. Alternatively or additionally, the difference may comprise a weighted SATD, wherein each sample is assigned with a corresponding weight. Alternatively or additionally, the difference may comprise a weighted SSD, wherein each sample is assigned with a corresponding weight.

It should be understood that some other proper metrics may be used to indicate the difference between the set of neighboring samples and the set of reference samples, and the present disclosure is not aimed to be limited in this regard.

In some further embodiments, the template matching cost may be determined further based on a boundary difference between a set of reconstructed samples neighboring to the set of neighboring samples and the set of reference samples.

For example, the video encoder 200 may determine a set of reconstructed samples adjacently or non-adjacently neighboring to the set of neighboring samples. In some examples, the set of reconstructed samples may comprise samples left to the set of neighboring samples. In some other examples, the set of reconstructed samples may comprise samples above the set of neighboring samples.

The video encoder may then determine the boundary difference between the set of reference samples and the set of reconstructed samples. In some embodiments, the boundary difference may comprise a sum of absolute differences (SAD) between the set of reference samples and the set of reconstructed samples. In some other embodiments, the boundary difference may comprise a sum of absolute transformed differences (SATD) between the set of reference samples and the set of reconstructed samples. In some further embodiments, the boundary difference may comprise a sum of squared differences (SSD) the set of reference samples and the set of reconstructed samples. In some further embodiments, the boundary difference may comprise a weighted sum of two or more of SAD, SATD and SSD as discussed herein.

In some embodiment, the boundary difference may comprise a weighted SAD, wherein each sample is assigned with a corresponding weight. For example, in the set of reconstructed samples, the samples which are adjacent to the set of neighboring samples may be assigned with a higher weight. Alternatively or additionally, the boundary difference may comprise a weighted SATD, wherein each sample is assigned with a corresponding weight. Alternatively or additionally, the boundary difference may comprise a weighted SSD, wherein each sample is assigned with a corresponding weight.

In some embodiments, the template matching cost may be determined as a weighted sum of the boundary difference between the set of reference samples and the set of reconstructed samples and the difference between the set of neighboring samples and the set of reference samples.

In some embodiments, the weights may for example be encoded into the bitstream. Alternatively, the weights may also be shared as constant parameters shared between the video encoder and the video decoder.

In some embodiments, the set of neighboring samples, the set of reference samples or the set of reconstructed samples may be pre-processed before being using to determine the template matching cost.

In some embodiments, to reduce the computation cost, the set of neighboring samples and the set of reference samples may be subsampled or downsampled before being used to calculate the template matching cost. Additionally, whether to and/or how to do subsampling may depend on the dimensions of the sample set. For example, no subsampling is to be performed for the short side of the sample set.

In some embodiments, if a Local Illumination Compensation (LIC) flag associated with a candidate is true, the set of reference samples shall be processed with a LIC method before being used to determine the template matching cost.

In the example of FIG. 7, the motion vector associated with the candidate is unidirectional. In some other cases, the candidate may indicate motion vectors in two directions.

Figure 8:
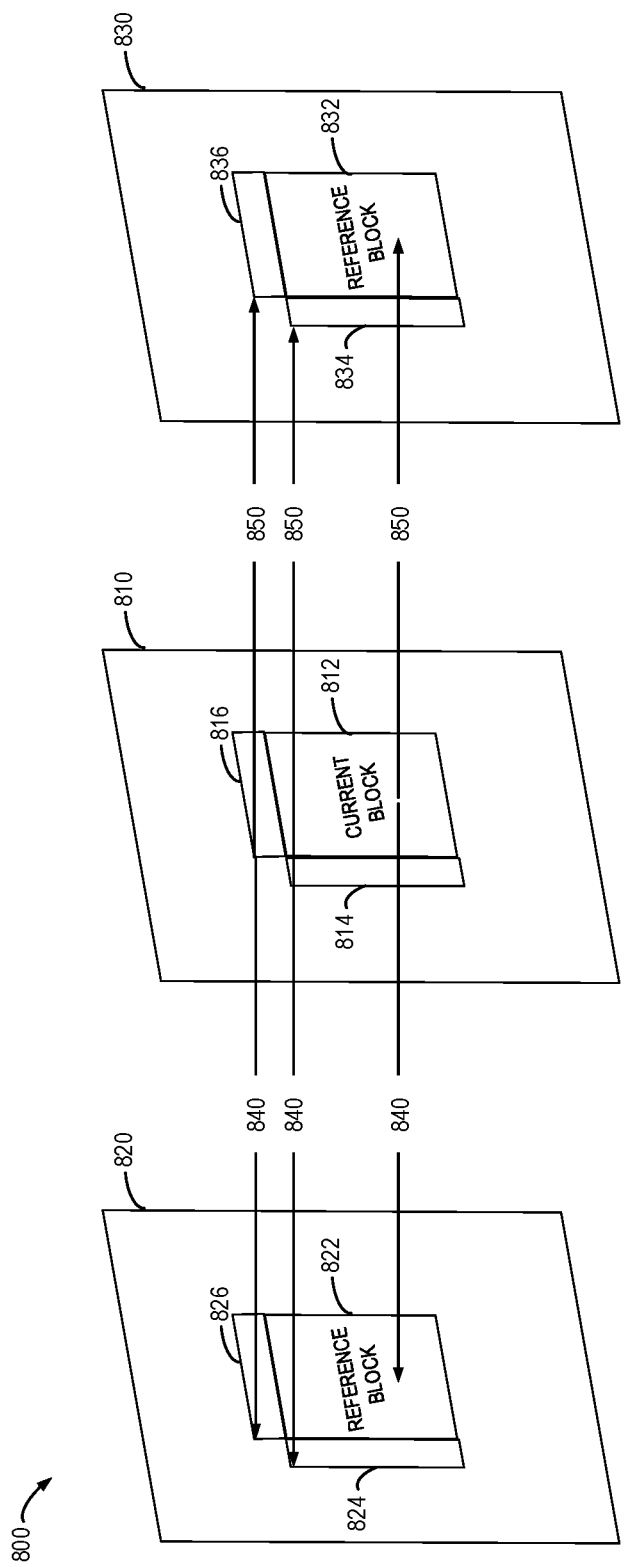
FIG. 8 illustrates a schematic diagram of determining a template matching cost in accordance with some other embodiments of the present disclosure.

FIG. 8 illustrates a schematic diagram 800 of determining a template matching cost in accordance with some other embodiments of the present disclosure.

In this example, the candidate may be associated with motion information, which comprise a first a first motion vector 840 in a first direction and a second motion vector 850 in a second direction.

Similar to the example in FIG. 7, the video encoder 200 may determine a set of neighboring samples of the current video block 812 in the current picture 810. The set of neighboring samples may comprise samples 814 left to the current video block 812 and/or neighboring samples 816 above the current video block 812.

Further, the video encoder 200 may determine a first set of reference samples based on the first motion vector 840 in the reference picture 820. For example, the first set of reference samples may comprise the set of reference samples 824 and 826.

Similarly, the video encoder 200 may determine a second set of reference samples based on the second motion vector 850 in the reference picture 830. For example, the first set of reference samples may comprise the set of reference samples 834 and 836.

In some embodiments, the video encoder 200 may determine the set of reference samples based on a weighted sum of the first set of reference samples and the second set of reference samples. For example, the set of reference samples may be determined according to the following formulation:

$$RT=((2^N-w)*RT_0+w*RT_1+2^{N-1})>>N \quad (1)$$

wherein RT denotes the final set of reference sample, RT0 denotes the first set of reference samples, $RT_1$ denotes the second set of reference samples, w denotes a weight coefficient, and N is an integer.

In some embodiments, the weight coefficient w may be determined according to a Bi-prediction with CU-level weight (BCW) index associated with the candidate. In one example, BCW index is equal to 0, w is set equal to −2. In another example, if BCW index is equal to 1, w is set equal to 3. In a further example, if BCW index is equal to 2, w is set equal to 4. In a further example, if BCW index is equal to 3, w is set equal to 5. In a further example, if BCW index is equal to 4, w is set equal to 10.

After determining the template matching cost for each candidate in the subgroup, the video encoder 200 may reorder the subgroup of the candidates according to an ascending order of costs. Continuing with the example in FIG. 6, the video encoder 200 may reorder the first subgroup 610 to obtain a reordered group 630. As can be seen, an order for the candidates in the subgroup is changed from "MODE 0, MODE 1, MODE 2, MODE 3, MODE 4" in the first subgroup 610 to "MODE 3, MODE 4, MODE 1, MODE 0, MODE 2" in the reordered subgroup 630. Further, in the example of FIG. 6, the second subgroup 620 is not be reordered.

Referring back to FIG. 5, at block 508, the video encoder 200 derives the motion information from the list of candidates. In some embodiments, the video encoder 200 may select the motion information from the final list of candidates according to particular criterions. For example, the video encoder may consider a balance between an encoding cost of the index and a template matching cost for determining the motion information. It should be understood that the video encoder 200 may utilize any proper methods to determine the best candidate, and the present disclosure is not aimed to be limited in this regard.

At block 510, the video encoder 200 encodes an index for the motion information into a bitstream.

In some embodiments, the video encoder 200 may determine the index based on a position of the selected motion information in the final list of candidates. For example, in the example of FIG. 6, if "motion information 4" is selected as the motion information, the index may be set as having a value "1", which indicates the motion information is ranked in a second place in the final list of candidates. In this case, the index with a value "1" may also indicate that the motion information is within the subgroup 630.

As can be seen, in the initial group of candidates without reordering, if "motion information 4" is to be selected as the motion information, the index would have a value "4". After the reordering, the value for the index is now "1", which requires a much less bits in the bitstream. In this way, the transmission efficiency for the index is significantly improved.

In some further embodiments, a value of the index may directly indicate the subgroup 630 and a position of the motion information in the subgroup 630. For example, the index may be set with a value "01", wherein "0" may indicates the motion information belong to the subgroup 630 and "1" indicates that the motion information is ranked in the second place in the subgroup 630.

After determining the index, the video encoder 200 may encode the index into the bitstream, for example, using truncated unary binarization (TU). It should be understood that, any proper encoding methods may be utilized to encode the value of the index into the bitstream, and the present disclosure is not aimed to be limited in this regard.

In some embodiments, the video encoder 200 may also encode a message into the bitstream for indicating that the adaptive merge candidate list reordering as discussed above is applied or not. In some embodiments, the message may be included in VP S/SPS/PPS/sequence header/picture header/slice header/CTU/CU/TU/PU.

In some embodiments, it may also be a region based on signaling. For example, the picture may be partitioned into groups of CTU/CUs evenly or unevenly, and one flag is encoded for each group to indicate whether the adaptive merge candidate list reordering as discussed above is applied or not.

Based on the encoding solution discussed above, the embodiments of the present disclosure may adaptively determine which of the subgroups are to be reordered, thereby balancing the improvement of bitstream transmission efficiency and the increase of coding complexity.

Decoding of Motion Information

According to embodiments of the subject matter described herein, a solution for decoding motion information is proposed. It should be understood that the solution for decoding motion information may be used in cooperation with the video encoding solution as discussed above or be independently utilized.

In this solution, an index for motion information of a current video block is decoded from a bitstream of a video. Further, a group type of a subgroup of candidates indicated by the index is determined. Additionally, a list of candidates are constructed, wherein a number of candidates included in the list of candidates is determined based on the group type and the index. Further, the motion information for the current video block is then derived from the list of candidates.

In this way, the embodiments of the present disclosure may rapidly determine the motion information for a current video block. Further, the improvement of bitstream transmission efficiency and the increase of coding complexity are also balanced.

Figure 9:
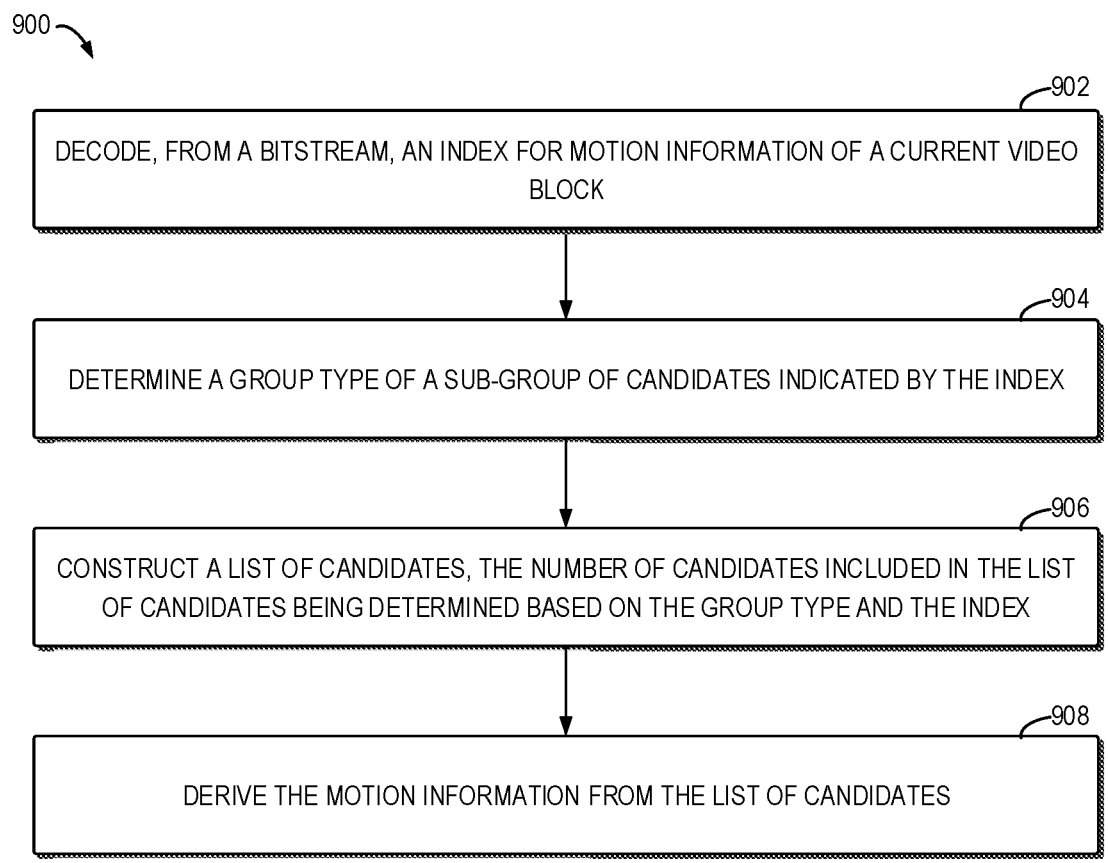
FIG. 9 illustrates a flowchart of a process of decoding motion information in accordance with some embodiments of the present disclosure.

FIG. 9 illustrates a flowchart of a process 900 of decoding motion information according to some embodiments of the subject matter as described herein. The process 900 may be implemented by the video decoder 300 in FIG. 3.

As shown in FIG. 9, at block 902, the video decoder 300 decodes, from a bitstream of a video, an index for motion information of a current video block.

Corresponding to the step as discussed with reference to block 510, the video decode 300 may for example utilize a corresponding decoding method to decode the index from a video bitstream.

At block 904, the video decoder 300 determines a group type of a subgroup of candidates indicated by the index. In some embodiments, the type indicates whether a first order associated with the subgroup is different from a predetermined order. It should be understood that the predetermined order herein may refer to the default order as defined in the coding standard.

Figure 10:
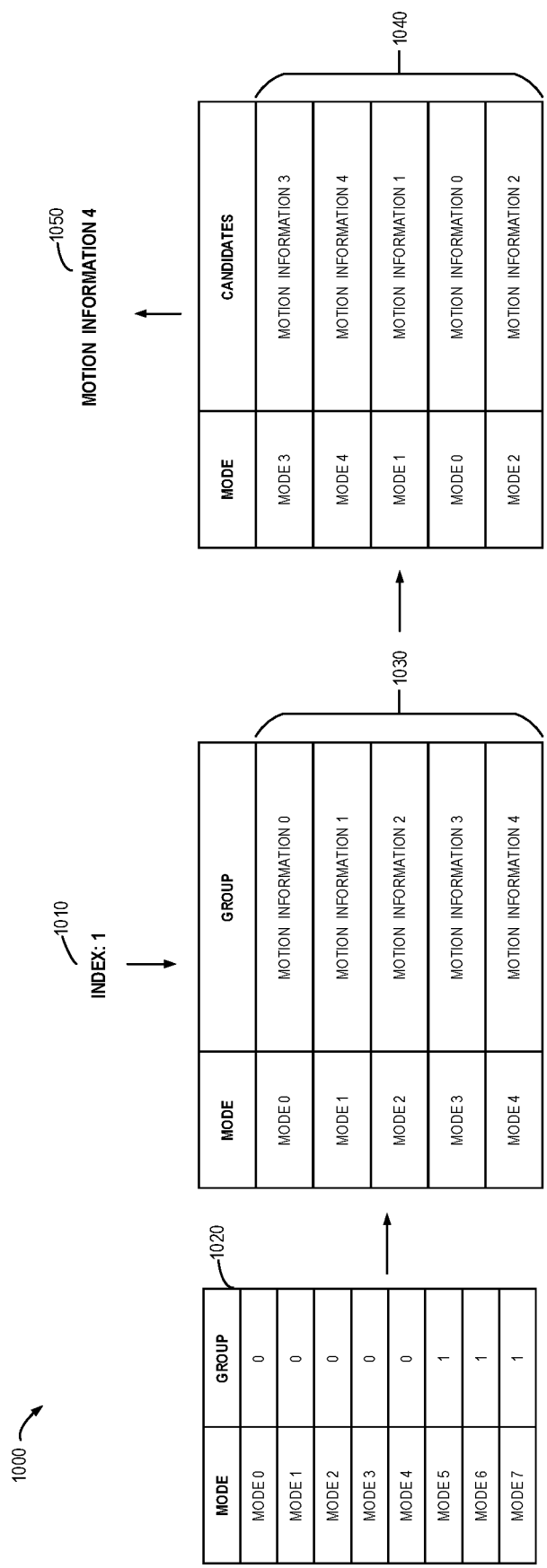
FIG. 10 illustrates a schematic diagram of decoding motion information in accordance with some embodiments of the present disclosure.

In some embodiments, the subgroup indicated by the index may be determined according to grouping information. The grouping information may by which candidates are included in each of a plurality of subgroups during encoding process. FIG. 10 illustrates a schematic diagram 1000 of decoding motion information in accordance with some embodiments of the present disclosure. In the example of FIG. 10, an index 1010 with a value "1" is decoded from the video bitstream. In this example, the value "1" may be determined, based on grouping information 1020, as being indicating that the motion information belong to a subgroup of candidates comprising the first five candidates.

Figure 11:
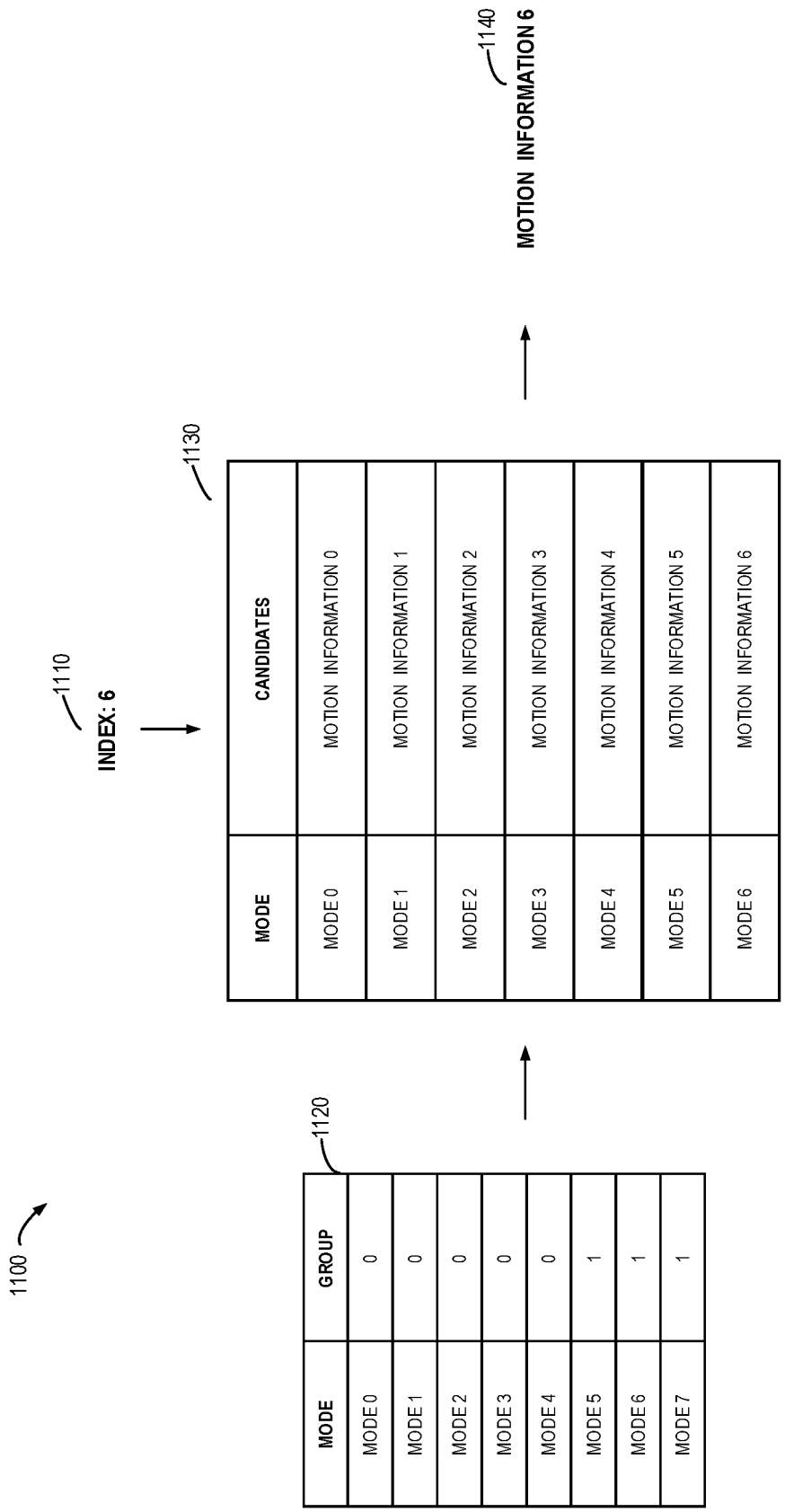
FIG. 11 illustrates a schematic diagram of decoding motion information in accordance with some other embodiments of the present disclosure.

FIG. 11 shows another example, wherein a schematic diagram 1100 of decoding motion information in accordance with some other embodiments is illustrated. In the example of FIG. 11, an index 1110 with a value "6" is decoded from the video bitstream. In this example, the value "6" may be determined, based on grouping information 1120, as being indicating that the motion information belong to a subgroup comprising the last three candidates.

In some embodiments, the grouping information may be decoded from the video bitstream. Alternatively, the grouping information may also be preconfigured for the video decoder 300.

In some further embodiments, the grouping information may be adaptively generated by the video decoder 300 for each video block. For example, it may be predefined that a size of at least one of the plurality of subgroups is determined based on at least one of: a number of available adjacent spatial merge candidates, a number of available spatial temporal motion vector prediction (STMVP) merge candidates, a number of available temporal merge candidates, a number of available non-adjacent spatial merge candidates, a number of available HMVP merge candidates, or a number of available pair-wise average merge candidates.

For example, a size of the first subgroup may be determined based on a sum of a number of available adjacent spatial merge candidates, a number of available spatial temporal motion vector prediction (STMVP) merge candidates and a number of available temporal merge candidates.

Example grouping information 1020 is shown in FIG. 10 for illustration, and the grouping information may for example indicate which types of candidates are grouped together and the sequences of the subgroups. In this example, the index 1010 with a value "1" may be determine as indicating the motion information is selected from the first subgroup and the motion information is ranked in the whole group of candidates.

In a further example, as discussed above, the decoded index may directly indicate the subgroup and a position of the motion information in the subgroup. For example, and index with a value "01" may indicates the motion information is selected from the first subgroup and the motion information is ranked in a second place in the whole group of candidates.

It should be understood that, depending on how the index is determined and encoded by a video encoder (e.g., the video encoder 200), the video decoder 300 may decode the index and determine the subgroup indicated by the index accordingly.

In some embodiments, as discussed in the encoding process, the grouping and reordering processes may be performed only in some coding modes. Accordingly, the video decoder 300 may first determine a coding mode of the video bitstream. If the coding mode is not one of: a merge mode with motion vector differences (MMVD) mode, a geometric partitioning mode (GPM), a triangle partition mode, or a sub-block based merge mode, the video decoder 300 will then perform the process 900, and determined a subgroup of candidates indicated by the index. Otherwise, a traditional motion information decoding may be utilized, which is not to be described herein.

In some embodiments, as discussed in the encoding process, the grouping and reordering processes may be performed only if a size of the current video block satisfies a particular condition. Accordingly, the video decoder 300 may first determine whether a corresponding condition utilized in the coding process is satisfied.

In one example, if a height of the current video block is greater than or equal to a first threshold, the video decoder 300 will then perform the process 900, and determined a subgroup of candidates indicated by the index.

In another example, if a height of the current video block is greater than or equal to a first threshold, the video decoder 300 will then perform the process 900, and determined a subgroup of candidates indicated by the index.

In a further example, if a product of the height and the width of the current video block is greater than or equal to a third threshold, the video decoder 300 will then perform the process 900, and determined a subgroup of candidates indicated by the index.

In a further example, if at least two or more of the conditions as discussed above are satisfied, the video decoder 300 will then perform the process 900, and determined a subgroup of candidates indicated by the index.

In some embodiments, as discussed in the encoding process, a message may be encoded in the bitstream for indicating whether the adaptive merge candidate list reordering as discussed above is applied or not. Accordingly, the video decoder 300 may first decode from the bitstream the message for determining whether the grouping and reordering processes are enabled in the encoding process.

In some embodiments, the video decoder 300 may decode the message based on VPS/SPS/PPS/sequence header/picture header/slice header/CTU/CU/TU/PU. For example, the picture may be partitioned into groups of CTU/CUs evenly or unevenly, and one flag may be decoded from the bitstream for each group to indicate whether the adaptive merge candidate list reordering as discussed above is applied or not.

Corresponding to the step as discussed with reference to block 506, the video decode 300 may utilize a corresponding method to determine the group type of the subgroup of candidates indicated by the index.

In some embodiments, if a flag whether a subgroup is to be reordered is encoded into the bitstream by the video encoder, the video decoder 300 may decode from the bitstream a flag associated with the subgroup and then determine the group type based on a value of the decoded flag. For example, a flag with a value "0" may indicate that the corresponding subgroup is not to be reordered, and a flag with a value "1" may indicate that the corresponding subgroup is to be reordered.

In some embodiments, in the encoding process, whether a respective subgroup of candidates are to be reordered may be determined based on a sequence number of the respective subgroup among a plurality of subgroups divided from the group of candidates. Accordingly, if a sequence number greater than a threshold, the video decoder 300 may determine the group type as a first type indicating that the first order is same as the predetermined order. Alternatively, if a sequence number less than or equal to the threshold, the video decoder 300 may determine the group type as a second type indicating that the first order is different from the predetermined order. In some embodiments, the threshold may be decoded from the bitstream. Alternatively, the threshold may be preconfigured for the video decoder 300.

In the examples of FIGS. 10-11, the video decoder 300 may determine that the first subgroup (e.g., comprising the first five candidates) is to be reordered, and the second subgroup (e.g., comprising the last three candidates) is not to be reordered. It shall be understood that the process of determining the sequence number may be performed with reference to the encoding process as discussed above, and is not described in detail here.

At block 906, the video decoder 300 constructs a list of candidates according to the predetermined order, wherein a number (referred to as a target number) of candidates included in the list of candidates is determined based on the group type and the index.

In some embodiments, if the type indicates that the first order is different from the predetermined order, the video decoder 300 may determine the target number based on the index and grouping information associated with the group of candidates, such that all of the subgroup of candidates indicated by the index are included in the list of candidates, wherein the grouping information indicate which candidates are included in each of the plurality of subgroups.

As shown in example of FIG. 10, the video decoder 300 may determine that the index 1010 is corresponding to the first subgroup, and the order for this subgroup is different from a predetermined order. In this case, the video decoder 300 may determine that all of the candidates in this subgroup and a subgroup with a less sequence number (if any) shall be constructed. For example, in the example of FIG. 10, the video decoder 300 may determine that all of the five candidates in the first subgroup shall be constructed.

Further, the video decoder 300 may construct the list of candidates according to the predetermined order. Continuing with the example in FIG. 10, the video decoder may obtain five candidates according to the predetermine order as defined in the coding standard.

In a further example, if the initial list of candidates is divided into three subgroups and the index is corresponding to a second subgroup, the video decoder 300 may determine the target number based on a size of the first subgroup and a size of the second subgroup. For example, if the first subgroup comprises the $1^{st}$ to $3^{rd}$ candidates, the second subgroup comprises the $4^{th}$ to $6^{th}$ candidates, and the third subgroup comprises the $7^{th}$ to $8^{th}$ candidates, and it is determined that the first and second subgroups are reordered. In this case, the video decoder 300 may determine that six candidates are to be constructed based on sizes of the first and second subgroups.

In some other embodiments, if the group type indicates that the first order is same as the predetermined order, the video decoder 300 may determine the target number based on the position indicated by the index without considering the subgroup indicated by the index. In the example of FIG. 11, the video decoder 300 may determine that the first order for the second subgroup is the same as the predetermined order. In this case, the video decoder 300 may determine that six candidate are to be constructed based on the position (i.e., the $6^{th}$ place) indicated by the index 1110. Further, the video decoder 300 may then construct the list of candidates by obtaining the target number of candidates according to the predetermined order.

Referring back to FIG. 9, at block 908, the video decoder 300 derives the motion information from the list of candidates.

In some embodiments, if the index is corresponding to first type indicating that the first order associated with the subgroup is same as the predetermined order, the video decoder 300 may first determine, from the list of candidates, a plurality of candidates corresponding to the subgroup indicated by the index. In the example of FIG. 10, it may be determined that all of the five candidates are all corresponding to the subgroup indicated by the index.

In another example, if the first subgroup comprises the $1^{st}$ to $3^{rd}$ candidates, the second subgroup comprises the $4^{th}$ to $6^{th}$ candidates, and the third subgroup comprises the $7^{th}$ to $8^{th}$ candidates, and it is determined the first and second subgroups are reordered. If the value of the index is "4", the video decoder may determine that $4^{th}$ to $6^{th}$ candidates are corresponding to the subgroup indicated by the index.

Further, the video decoder 300 may reorder the plurality of candidates according to a predefined criterion, and then determine the motion information from the list of candidates based on the index. It shall be understood that, the reordering process by the video decoder 300 may be the same as the reordering process by the video encoder 200.

In some embodiments, the video decoder 300 may determine a template matching cost associated with each of the plurality of candidates, wherein the template matching cost is determined based on a difference between a set of neighboring samples of the current video block and a set of reference samples corresponding to the set of neighboring samples, and the set of reference samples are determined based on motion information indicated by a respective candidate. Further, the video decoder 300 may reorder the plurality of candidates based the template matching cost.

The various embodiments for determining the template matching cost as discussed above may be applied to the decoding process, which will be described in detail again.

In some embodiments, the motion information may comprise a motion vector, and the motion vector is adjusted to integer pixel accuracy for determining the set of reference samples.

In some embodiments, the set of reference samples are determined based on one of: a 2-tap interpolation process, a 4-tap interpolation process or a 6-tap interpolation process.

In some embodiments, the motion information comprises a first motion vector in a first direction and a second motion vector in a second direction, and the set of reference samples is determined based on a weighted sum of a first set of reference samples and a second set of reference samples, wherein the first set of reference samples are determined based on the first motion vector, and the second set of reference samples are determined based on the second motion vector.

Additionally, the first set of reference samples are assigned with a first weight and the second set of reference samples are assigned with a second weight for determining the weighted sum, and wherein at least one of the first weight and the second weight is determined according to a Bi-prediction with CU-level weight (BCW) index associated with the candidate.

In some embodiments, to reduce the computation cost, the set of neighboring samples and the set of reference samples may be subsampled or downsampled before being used to calculate the template matching cost. Additionally, whether to and/or how to do subsampling may depend on the dimensions of the sample set. For example, no subsampling is to be performed for the short side of the sample set.

In some embodiments, a Local Illumination Compensation (LIC) method is utilized for determining the set of reference samples if a LIC flag associated with the respective candidate is true.

After determining the set of reference samples, the video decoder 300 may determine a difference between the set of neighboring samples and the set of reference samples. In some embodiments, the difference may comprise a sum of absolute differences (SAD) between the set of neighboring samples and the set of reference samples. In some other embodiments, the difference may comprise a sum of absolute transformed differences (SATD) between the set of neighboring samples and the set of reference samples. In some further embodiments, the difference may comprise a sum of squared differences (SSD) between the set of neighboring samples and the set of reference samples.

In some further embodiments, the difference may comprise a weighted sum of two or more of SAD, SATD and SSD. In some embodiment, the difference may comprise a weighted SAD, wherein each sample is assigned with a corresponding weight. For example, in the set of neighboring samples, the samples which are adjacent to the current video block may be assigned with a higher weight. Alternatively or additionally, the difference may comprise a weighted SATD, wherein each sample is assigned with a corresponding weight. Alternatively or additionally, the difference may comprise a weighted SSD, wherein each sample is assigned with a corresponding weight.

It should be understood that some other proper metrics may be used to indicate the difference between the set of neighboring samples and the set of reference samples, and the present disclosure is not aimed to be limited in this regard.

In some embodiments, the template matching cost may be determined further based on a boundary difference between a set of reconstructed samples neighboring to the set of neighboring samples and the set of reference samples.

For example, the video decoder 300 may determine a set of reconstructed samples adjacently or non-adjacently neighboring to the set of neighboring samples. In some examples, the set of reconstructed samples may comprise samples left to the set of neighboring samples. In some other examples, the set of reconstructed samples may comprise samples above the set of neighboring samples.

The video decoder 300 may then determine the boundary difference between the set of reference samples and the set of reconstructed samples. In some embodiments, the boundary difference may comprise a sum of absolute differences (SAD) between the set of reference samples and the set of reconstructed samples. In some other embodiments, the boundary difference may comprise a sum of absolute transformed differences (SATD) between the set of reference samples and the set of reconstructed samples. In some further embodiments, the boundary difference may comprise a sum of squared differences (SSD) the set of reference samples and the set of reconstructed samples. In some further embodiments, the boundary difference may comprise a weighted sum of two or more of SAD, SATD and SSD as discussed herein.

In some embodiment, the boundary difference may comprise a weighted SAD, wherein each sample is assigned with a corresponding weight. For example, in the set of reconstructed samples, the samples which are adjacent to the set of neighboring samples may be assigned with a higher weight. Alternatively or additionally, the boundary difference may comprise a weighted SATD, wherein each sample is assigned with a corresponding weight. Alternatively or additionally, the boundary difference may comprise a weighted SSD, wherein each sample is assigned with a corresponding weight.

In some embodiments, the template matching cost may be determined as a weighted sum of the boundary difference between the set of reference samples and the set of reconstructed samples and the difference between the set of neighboring samples and the set of reference samples.

In some embodiments, if the plurality of candidates comprise a first candidate associated with a block above the current video block and a second candidate associated with a block on the left of the current video block, the video decoder 300 may reorder the first candidate and the second candidate according to a comparison between a height and a width of the current video block.

For example, if the width of current video block is larger than the height of current video block, the plurality of candidates may be reordered such that the first spatial candidate is located before the second spatial candidate in the reordered subgroup. Alternatively, if the width of current video block is smaller than the height of current video block, the plurality of candidates may be reordered such that the first spatial candidate is located after the second spatial candidate in the reordered subgroup.

In the example of FIG. 10, the video decoder 300 may for example reorder the plurality of candidates 1030 corresponding to the subgroup indicated by the index, and obtain the list of candidates 1040. The video decoder 300 may, based on the index 1010, then select the candidate ranked in the second place in the list of candidates 1040. That is, "motion information 4" is determined as the motion information 1050 of the current video block.

In a further example, if the index is corresponding to a second subgroup among a total of three subgroups, the video decoder 300 may only reorder the candidates in the second subgroup without reordering the first subgroup. For example, if the first subgroup comprises the $1^{st}$ to $3^{rd}$ candidates, the second subgroup comprises the $4^{th}$ to $6^{th}$ candidates, and the third subgroup comprises the $7^{th}$ to $8^{th}$ candidates, and the first and second subgroups are to be reordered. In this case, the video decoder 300 may only reorder the candidates in the second subgroup, and obtain the motion information of the current video block from the reordered second subgroup.

In some further embodiments, if the group type indicates that the first order is same as the predetermined order, the video decoder may determine the motion information of the current video block from the list of candidates without reordering.

In the example of FIG. 11, the video decoder 300 may construct the six candidates 1130 according to the predetermined order for example as defined in the coding standard and then select "motion information 6" as the motion information 1140 of the current video block based on the index 1110.

Based on the decoding solution discussed above, the embodiments of the present disclosure may rapidly determine the motion information of a current video block. Further, the improvement of bitstream transmission efficiency and the increase of coding complexity could also be balanced.

Example Implementations

Some example embodiments of the subject matter described herein are listed below.

Proposal 1. A method of coding video data, comprising:
determining, during a conversion between a current video block of a video and a bitstream of the video, a group type of a subgroup of candidates of motion information for the current video block, the group type indicating whether the subgroup of candidates are to be reordered;
constructing a list of candidates based on the group type; and
deriving the motion information for the current video block from the list of candidates.

Proposal 2. The method of proposal 1, wherein the conversion comprises decoding the current video block from the bitstream.

Proposal 3. The method of proposal 2, wherein the group type is determined based on an index for the motion information.

Proposal 4. The method of proposal 3, wherein the index for the motion information is signaled in the bitstream if the coding mode is not one of the following coding modes:
a merge mode with motion vector differences (MMVD) mode,
a geometric partitioning mode (GPM), a triangle partition mode, or
a sub-block based merge mode.

Proposal 5. The method of proposal 3, wherein the index for the motion information is signaled in the bitstream if at least one of the following conditions is satisfied.
a height of the current video block is greater than or equal to a first threshold,
a width of the current video block is greater than or equal to a second threshold, or
a product of the height and the width of the current video block is greater than or equal to a third threshold.

Proposal 6. The method of proposal 3, wherein the index is decoded from the bitstream if a first flag decoded from the bitstream has a first value.

Proposal 7. The method of proposal 1, wherein determining the group type of the subgroup of candidates comprises:
if a sequence number associated with the subgroup among a plurality of subgroups is greater than a threshold, determining the group type as a first type indicating that the subgroup of candidates are to be reordered; or
if a sequence number associated with the subgroup among the plurality of subgroups is less than or equal to the threshold, determining the group type as a second type indicating that the subgroup of candidates are not to be reordered.

Proposal 8. The method of proposal 7, wherein a size of at least one of the plurality of subgroups is determined based on at least one of:
a number of available adjacent spatial merge candidates,
a number of available spatial temporal motion vector prediction (STMVP) merge candidates,
a number of available temporal merge candidates,
a number of available non-adjacent spatial merge candidates,
a number of available HMVP merge candidates, or
a number of available pair-wise average merge candidates.

Proposal 9. The method of proposal 1, wherein a second flag indicating the group type is signaled in the bitstream.

Proposal 10. The method of proposal 1, wherein constructing the list of candidates comprises:
if the group type indicates that the subgroup of candidates are to be reordered, reordering the subgroup of candidates to obtain a reordered subgroup; and
constructing the list of candidates based on the reordered subgroup.

Proposal 11. The method of proposal 10, wherein the subgroup of candidates are reordered based on a template matching cost associated with each of the subgroup of candidates, the template matching cost being determined based on a first difference between a set of neighboring samples of the current video block and a set of reference samples corresponding to the set of neighboring samples, the set of reference samples being determined based on motion information indicated by a respective candidate.

Proposal 12. The method of proposal 11, wherein the set of neighboring samples only comprise samples of the luminance component.

Proposal 13. The method of proposal 11, wherein a shape of the set of neighboring samples is determined based on a shape of the current video block.

Proposal 14. The method of proposal 11, wherein the first difference is determined based on a down-sampled version of the set of neighboring samples and a down-sampled version of the set of reference samples.

Proposal 15. The method of proposal 11, wherein the motion information comprises a motion vector, and wherein the motion vector is adjusted to integer pixel accuracy for determining the set of reference samples.

Proposal 16. The method of proposal 11, wherein the set of reference samples are determined based on one of: a 2-tap interpolation process, a 4-tap interpolation process, a 6-tap interpolation process or 8-tap interpolation process.

Proposal 17. The method of proposal 11, wherein the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

Proposal 18. The method of proposal 17, wherein the first set of reference samples are associated with a first weight and the second set of reference samples are associated with a second weight, and wherein at least one of the first weight and the second weight is determined according to a Bi-prediction with CU-level weight (BCW) index associated with the respective candidate.

Proposal 19. The method of proposal 11, wherein a Local Illumination Compensation (LIC) method is utilized for determining the set of reference samples if a LIC flag associated with the respective candidate is true.

Proposal 20. The method of proposal 11, wherein the first difference comprises at least one of:
a sum of absolute differences (SAD), a sum of absolute transformed differences (SATD),
a sum of squared differences (SSD),
a weighted SAD,
a weighted SATD, or
a weighted SSD.

Proposal 21. The method of proposal 11, wherein the template matching cost is determined further based on a second difference between a set of reconstructed samples neighboring to the set of neighboring samples and the set of reference samples.

Proposal 22. The method of proposal 21, wherein the second difference comprises at least one of:
a sum of absolute differences (SAD),
a sum of absolute transformed differences (SATD),
a sum of squared differences (SSD),
a weighted SAD,
a weighted SATD, or
a weighted SSD.

Proposal 23. The method of proposal 21, wherein the template matching cost comprises a weighted sum of the first difference and the second difference.

Proposal 24. The method of proposal 23, wherein at least one of a third weight associated with the first difference and a fourth weight associated with the second difference is obtained from the bitstream.

Proposal 25. The method of proposal 10, wherein at least one of the following candidates is not be reordered during the reordering the subgroup of candidates:
a uni-prediction sub-block based merge candidate,
a subblock-based temporal motion vector prediction (SbTMVP) candidate,
a constructed affine candidate, or
a zero padding affine candidate.

Proposal 26. The method of proposal 10, wherein:
if the subgroup of candidates comprise a first candidate associated with a block above the current video block and a second candidate associated with a block on the left of the current video block, the first candidate and the second candidate are reordered according to a comparison between a height and a width of the current video block during the reordering the subgroup of candidates.

Proposal 27. The method of proposal 3, wherein constructing the list of candidates based on the group type comprises:
if the group type indicates that the subgroup of candidates are to be reordered, constructing the list of candidates based on the index such that all of the subgroup of candidates are included in the list of candidates.

Proposal 28. The method of proposal 3, wherein constructing the list of candidates based on the group type comprising:
if the group type indicates that the subgroup of candidates are not to be reordered, constructing the list of candidates according to a predetermined order based on the index.

Proposal 29. The method of proposal 1, wherein the conversion comprises encoding the current video block into the bitstream.

Proposal 30. A method of reordering merge candidates, comprising:
determining, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and
reordering the plurality of candidates of motion information based on the template matching cost.

Proposal 31. The method of proposal 30, wherein the set of neighboring samples only comprise samples of the luminance component.

Proposal 32. The method of proposal 30, wherein a shape of the set of neighboring samples is determined based on a shape of the current video block.

Proposal 33. The method of proposal 30, wherein the first difference is determined based on a down-sampled version of the set of neighboring samples and a down-sampled version of the set of reference samples.

Proposal 34. The method of proposal 30, wherein the motion information comprises a motion vector, and wherein the motion vector is adjusted to integer pixel accuracy for determining the set of reference samples.

Proposal 35. The method of proposal 30, wherein the set of reference samples are determined based on one of: a 2-tap interpolation process, a 4-tap interpolation process, a 6-tap interpolation process or 8-tap interpolation process.

Proposal 36. The method of proposal 31, wherein the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

Proposal 37. The method of proposal 36, wherein the first set of reference samples are associated with a first weight and the second set of reference samples are associated with a second weight, and wherein at least one of the first weight and the second weight is determined according to a Bi-prediction with CU-level weight (BCW) index associated with the respective candidate.

Proposal 38. The method of proposal 30, wherein a Local Illumination Compensation (LIC) method is utilized for determining the set of reference samples if a LIC flag associated with the respective candidate is true.

Proposal 39. The method of proposal 30, wherein the first difference comprises at least one of:
a sum of absolute differences (SAD),
a sum of absolute transformed differences (SATD),
a sum of squared differences (SSD),
a weighted SAD,
a weighted SATD, or
a weighted SSD.

Proposal 40. The method of proposal 30, wherein the template matching cost is determined further based on a second difference between a set of reconstructed samples neighboring to the set of neighboring samples and the set of reference samples.

Proposal 41. The method of proposal 40, wherein the second difference comprises at least one of:
a sum of absolute differences (SAD),
a sum of absolute transformed differences (SATD),
a sum of squared differences (SSD),
a weighted SAD,
a weighted SATD, or
a weighted SSD.

Proposal 42. The method of proposal 40, wherein the template matching cost comprises a weighted sum of the first difference and the second difference.

Proposal 43. The method of proposal 42, wherein at least one of a third weight associated with the first difference and a fourth weight associated with the second difference is obtained from the bitstream.

Proposal 44. A method of reordering merge candidates, comprising:

determining, during a conversion between a current video block of a video and a bitstream of the video, a height and a width of the current video block; and reordering a first candidate and a second candidate in a merge candidate list according to a comparison between a height and a width of the current video block, wherein the first candidate is associated with a block above the current video block and a second candidate is associated with a block on the left of the current video block.

Proposal 45. A method of determining cost associated with a merge candidate, comprising determining, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and determining a cost associated with the candidate based on the first difference.

Proposal 46. The method of proposal 45, wherein the set of neighboring samples only comprise samples of the luminance component.

Proposal 47. The method of proposal 45, wherein a shape of the set of neighboring samples is determined based on a shape of the current video block.

Proposal 48. The method of proposal 45, wherein the first difference is determined based on a down-sampled version of the set of neighboring samples and a down-sampled version of the set of reference samples.

Proposal 49. The method of proposal 45, wherein the motion information comprises a motion vector, and wherein the motion vector is adjusted to integer pixel accuracy for determining the set of reference samples.

Proposal 50. The method of proposal 45, wherein the set of reference samples are determined based on one of: a 2-tap interpolation process, a 4-tap interpolation process, a 6-tap interpolation process or 8-tap interpolation process.

Proposal 51. The method of proposal 45, wherein the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

Proposal 52. The method of proposal 51, wherein the first set of reference samples are associated with a first weight and the second set of reference samples are associated with a second weight, and wherein at least one of the first weight and the second weight is determined according to a Bi-prediction with CU-level weight (BCW) index associated with the respective candidate.

Proposal 53. The method of proposal 45, wherein a Local Illumination Compensation (LIC) method is utilized for determining the set of reference samples if a LIC flag associated with the respective candidate is true.

Proposal 54. The method of proposal 45, wherein the first difference comprises at least one of:

a sum of absolute differences (SAD), a sum of absolute transformed differences (SATD), a sum of squared differences (SSD), a weighted SAD, a weighted SATD, or a weighted SSD.

Proposal 55. The method of proposal 45, wherein the cost is determined further based on a second difference between a set of reconstructed samples neighboring to the set of neighboring samples and the set of reference samples.

Proposal 56. The method of proposal 55, wherein the second difference comprises at least one of:

a sum of absolute differences (SAD), a sum of absolute transformed differences (SATD), a sum of squared differences (SSD), a weighted SAD, a weighted SATD, or a weighted SSD.

Proposal 57. The method of proposal 55, wherein the cost comprises a weighted sum of the first difference and the second difference.

Proposal 58. The method of proposal 57, wherein at least one of a third weight associated with the first difference and a fourth weight associated with the second difference is obtained from the bitstream.

Proposal 59. An electronic device, comprising:

a processing unit; and a memory coupled to the processing unit and having instructions stored thereon which, when executed by the processing unit, cause the electronic device to perform the method according to:

determine, during a conversion between a current video block of a video and a bitstream of the video, a group type of a subgroup of candidates of motion information for the current video block, the group type indicating whether the subgroup of candidates are to be reordered;

construct a list of candidates based on the group type; and derive the motion information for the current video block from the list of candidates.

Proposal 60. An electronic device, comprising:

a processing unit; and a memory coupled to the processing unit and having instructions stored thereon which, when executed by the processing unit, cause the electronic device to perform the method according to:

determine, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and reorder the plurality of candidates of motion information based on the template matching cost.

Proposal 61. An electronic device, comprising:

a processing unit; and a memory coupled to the processing unit and having instructions stored thereon which, when executed by the processing unit, cause the electronic device to perform the method according to:

determine, during a conversion between a current video block of a video and a bitstream of the video, a height and a width of the current video block; and reorder a first candidate and a second candidate in a merge candidate list according to a comparison between a height and a width of the current video block, wherein the first candidate is associated with a block above the current video block and a second candidate is associated with a block on the left of the current video block.

Proposal 62. An electronic device, comprising:
a processing unit; and
a memory coupled to the processing unit and having instructions stored thereon which, when executed by the processing unit, cause the electronic device to perform the method according to:
determine, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and
determine a cost associated with the candidate based on the first difference.

Proposal 63. A non-transitory computer-readable storage medium storing instructions that cause a processor to:
determine, during a conversion between a current video block of a video and a bitstream of the video, a group type of a subgroup of candidates of motion information for the current video block, the group type indicating whether the subgroup of candidates are to be reordered;
construct a list of candidates based on the group type; and
derive the motion information for the current video block from the list of candidates.

Proposal 64. A non-transitory computer-readable storage medium storing instructions that cause a processor to:
determine, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and
reorder the plurality of candidates of motion information based on the template matching cost.

Proposal 65. A non-transitory computer-readable storage medium storing instructions that cause a processor to:
determine, during a conversion between a current video block of a video and a bitstream of the video, a height and a width of the current video block; and
reorder a first candidate and a second candidate in a merge candidate list according to a comparison between a height and a width of the current video block, wherein the first candidate is associated with a block above the current video block and a second candidate is associated with a block on the left of the current video block.

Proposal 66. A non-transitory computer-readable storage medium storing instructions that cause a processor to:
determine during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and
determine a cost associated with the candidate based on the first difference.

Proposal 67. A non-transitory computer-readable recording medium storing a bitstream of a video which is generated by a method performed by a video processing apparatus, wherein the method comprises:
determining, during a conversion between a current video block of a video and a bitstream of the video, a group type of a subgroup of candidates of motion information for the current video block, the group type indicating whether the subgroup of candidates are to be reordered;
constructing a list of candidates based on the group type; and
deriving the motion information for the current video block from the list of candidates.

Proposal 68. A non-transitory computer-readable recording medium storing a bitstream of a video which is generated by a method performed by a video processing apparatus, wherein the method comprises:
determining, during a conversion between a current video block of a video and a bitstream of the video, a template matching cost associated with each of a plurality of candidates of motion information for the current video block, the template matching cost being determined based on a first difference between a set of neighboring samples of the current video block and a set of reference samples corresponding to the set of neighboring samples, the set of reference samples being determined based on motion information indicated by a respective candidate; and
reordering the plurality of candidates of motion information based on the template matching cost.

Proposal 69. A non-transitory computer-readable recording medium storing a bitstream of a video which is generated by a method performed by a video processing apparatus, wherein the method comprises:
determining, during a conversion between a current video block of a video and a bitstream of the video, a height and a width of the current video block; and
reordering a first candidate and a second candidate in a merge candidate list according to a comparison between a height and a width of the current video block, wherein the first candidate is associated with a block above the current video block and a second candidate is associated with a block on the left of the current video block.

Proposal 70. A non-transitory computer-readable recording medium storing a bitstream of a video which is generated by a method performed by a video processing apparatus, wherein the method comprises:
determining, during a conversion between a current video block of a video and a bitstream of the video, a first difference between a set of neighboring samples of the current video block and a set of reference samples corresponding to the set of neighboring samples, the set of reference samples being determined based on motion information indicated by a candidate of motion information; and
determining a cost associated with the candidate based on the first difference.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single implementation. Rather, various features described in a single implementation may also be implemented in multiple embodiments separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

Example Device

Figure 12:
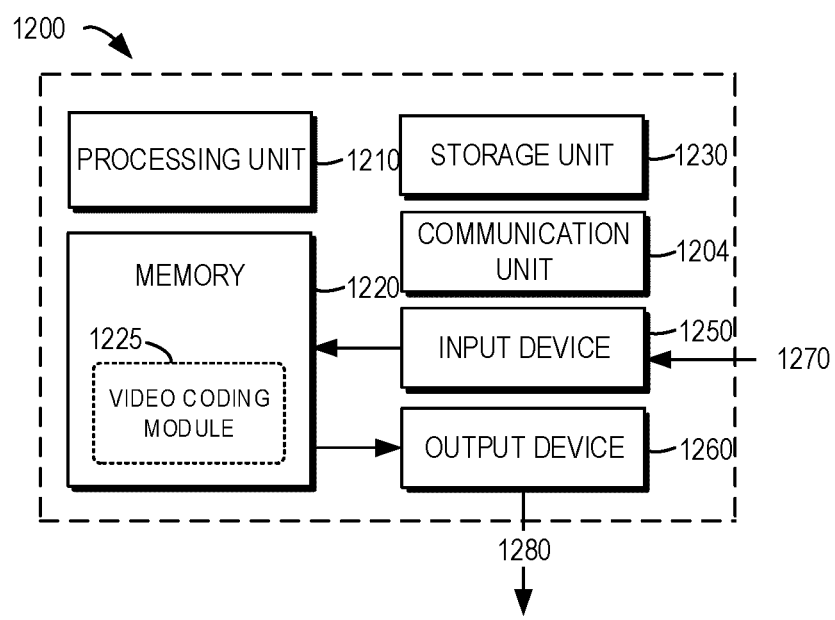
FIG. 12 illustrates a block diagram of an electronics device in which various embodiments of the present disclosure can be implemented.

FIG. 12 illustrates a block diagram of a computing device 1200 in which various embodiments of the present disclosure can be implemented. The computing device 1200 may be implemented as or included in the source device 110 (or the video encoder 114 or 200) or the destination device 120 (or the video decoder 124 or 300).

It would be appreciated that the computing device 1200 shown in FIG. 12 is merely for purpose of illustration, without suggesting any limitation to the functions and scopes of the embodiments of the present disclosure in any manner.

As shown in FIG. 12, the computing device 1200 includes a general-purpose computing device 1200. The computing device 1200 may at least comprise one or more processors or processing units 1210, a memory 1220, a storage device 1230, one or more communication units 1240, one or more input devices 1250, and one or more output devices 1260.

In some embodiments, the computing device 1200 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1200 can support any type of interface to a user (such as "wearable" circuitry and the like).

The processing unit 1210 may be a physical or virtual processor and can implement various processes based on programs stored in the memory 1220. In a multi-processor system, multiple processing units execute computer executable instructions in parallel so as to improve the parallel processing capability of the computing device 1200. The processing unit 1210 may also be referred to as a central processing unit (CPU), a microprocessor, a controller or a microcontroller.

The computing device 1200 typically includes various computer storage medium. Such medium can be any medium accessible by the computing device 1200, including, but not limited to, volatile and non-volatile medium, or detachable and non-detachable medium. The memory 1220 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 1230 may be any detachable or non-detachable medium and may include a machine-readable medium such as a memory, flash memory drive, magnetic disk or another other media, which can be used for storing information and/or data and can be accessed in the computing device 1200.

The computing device 1200 may further include additional detachable/non-detachable, volatile/non-volatile memory medium. Although not shown in FIG. 12, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1240 communicates with a further computing device via the communication medium. In addition, the functions of the components in the computing device 1200 can be implemented by a single computing cluster or multiple computing machines that can communicate via communication connections. Therefore, the computing device 1200 can operate in a networked environment using a logical connection with one or more other servers, networked personal computers (PCs) or further general network nodes.

The input device 1250 may be one or more of a variety of input devices, such as a mouse, keyboard, tracking ball, voice-input device, and the like. The output device 1260 may be one or more of a variety of output devices, such as a display, loudspeaker, printer, and the like. By means of the communication unit 1240, the computing device 1200 can further communicate with one or more external devices (not shown) such as the storage devices and display device, with one or more devices enabling the user to interact with the computing device 1200, or any devices (such as a network card, a modem and the like) enabling the computing device 1200 to communicate with one or more other computing devices, if required. Such communication can be performed via input/output (I/O) interfaces (not shown).

In some embodiments, instead of being integrated in a single device, some or all components of the computing device 1200 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1200 may be used to implement video encoding/decoding in embodiments of the present disclosure. The memory 1220 may include one or more video coding modules 1225 having one or more program instructions. These modules are accessible and executable by the processing unit 1210 to perform the functionalities of the various embodiments described herein.

In the example embodiments of performing video encoding, the input device 1250 may receive video data as an input 1270 to be encoded. The video data may be processed, for example, by the video coding module 1225, to generate an encoded bitstream. The encoded bitstream may be provided via the output device 1260 as an output 1280.

In the example embodiments of performing video decoding, the input device 1250 may receive an encoded bitstream as the input 1270. The encoded bitstream may be processed, for example, by the video coding module 1225, to generate decoded video data. The decoded video data may be provided via the output device 1260 as the output 1280.

The detailed inventions below should be considered as examples to explain general concepts. These inventions should not be interpreted in a narrow way. Furthermore, these inventions can be combined in any manner.

Hereinafter, template is a set of reconstructed samples adjacently or non-adjacently neighboring to the current block. Reference samples of the template are derived according to the same motion information of the current block. For example, reference samples of the template are mapping of the template depend on a motion information. In this case, reference samples of the template are located by a motion vector of the motion information in a reference picture indicated by the reference index of the motion information. FIG. 4-1 shows an example, wherein RT represents the reference samples of the template T.

The merge candidates can be divided to several groups according to some criterions. Each group is called a subgroup. For example, we can take adjacent spatial and temporal merge candidates as a first subgroup and take the remaining merge candidates as a second subgroup; In another example, we can also take the first N (N≥2) merge candidates as a first subgroup, take the following M (M≥2) merge candidates as a second subgroup, and take the remaining merge candidates as a third subgroup. Note that the proposed methods may be applied to merge candidate list construction process for inter coded blocks (e.g., translational motion), affine coded blocks; or other motion candidate list construction process (e.g., AMVP list; IBC AMVP list; IBC merge list).

W and H are the width and height of current block (e.g., luma block). Taking merge candidate list construction process as an example in the following descriptions:
1. The merge candidates can be adaptively rearranged in the final merge candidate list according to one or some criterions.
   a. In one example, partial or full process of current merge candidate list construction process is firstly invoked, followed by the reordering of candidates in the list.
      i. Alternatively, candidates in a first subgroup may be reordered and they should be added before those candidates in a second subgroup wherein the first subgroup is added before the second subgroup.
         (i) In one example, multiple merge candidates for a first category may be firstly derived and then reordered within the first category; then merge candidates from a second category may be determined according to the reordered candidates in the first category (e.g., how to apply pruning).
      ii. Alternatively, a first merge candidate in a first category may be compared to a second merge candidate in a second category, to decide the order of the first or second merge candidate in the final merge candidate list.
   b. In one example, the merge candidates may be adaptively rearranged before retrieving the merge candidates.
      i. In one example, the procedure of arranging merge candidates adaptively may be processed before the obtaining the merge candidate to be used in the motion compensation process.
   c. In one example, if the width of current block is larger than the height of current block, the above candidate is added before the left candidate.
   d. In one example, if the width of current block is smaller than the height of current block, the above candidate is added after the left candidate.
   e. Whether merge candidates are rearranged adaptively may depend on the selected merging candidate or the selected merging candidate index.
      i. In one example, if the selected merging candidate is in the last subgroup, the merge candidates are not rearranged adaptively.
   f. In one example, a merge candidate is assigned with a cost, the merge candidates are adaptively reordered in an ascending order of costs of merge candidates.

i. In one example, the cost of a merge candidate may be a template matching cost.
ii. In one example, template is a set of reconstructed samples adjacently or non-adjacently neighboring to the current block.
iii. A template matching cost is derived as a function of T and RT, wherein T is a set of samples in the template and RT is a set of reference samples for the template.
   (i) How to obtain the reference samples of the template for a merge candidate may depend on the motion information of the merge candidate
   a) In one example, when deriving the reference samples of the template, the motion vectors of the merge candidate are rounded to the integer pixel accuracy, where the integer motion vector may be its nearest integer motion vector.
   b) In one example, when deriving the reference samples of the template, N-tap interpolation filtering is used to get the reference samples of the template at sub-pixel positions. For example, N may be 2, 4, 6, or 8.
   c) In one example, when deriving the reference samples of the template, the motion vectors of the merge candidates may be scaled to a given reference picture (e.g., for each reference picture list if available).
   d) For example, the reference samples of the template of a merge candidate are obtained on the reference picture of the current block indicated by the reference index of the merge candidate with the MVs or modified MVs (e.g., according to bullets a)-b)) of the merge candidate.
   e) For example, when a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1.
      [1] In one example, $RT_0$ includes a set of reference samples on the reference picture of the current block indicated by the reference index of the merge candidate referring to a reference picture in reference list 0 with the MV of the merge candidate referring to reference list 0),
      [2] In one example, $RT_1$ includes a set of reference samples on the reference picture of the current block indicated by the reference index of the merge candidate referring to a reference picture in reference list 1 with the MV of the merge candidate referring to reference list 1).
   f) In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$RT=(RT_0+RT_1+1)>>1$ g) In one example, the reference samples of the template ($RT_{bi-pred}$) for bi-directional prediction are derived by weighted averaging of the reference samples of the template in reference list0 ($RT_0$) and the reference samples of the template in reference list1 ($RT_1$). One example is as follows:

$RT=((2^N-w)*RT_0+w*RT_1+2^{N-1})>>N$, for example, $N=3$.

h) h) In one example, the weight of the reference template in reference list0 such as (8−w) and the weight of the reference template in reference list1 such as (w) maybe decided by the BCW index of the merge candidate.
      [1] In one example, BCW index is equal to 0, w is set equal to −2.
      [2] In one example, BCW index is equal to 1, w is set equal to 3.
      [3] In one example, BCW index is equal to 2, w is set equal to 4.
      [4] In one example, BCW index is equal to 3, w is set equal to 5.
      [5] In one example, BCW index is equal to 4, w is set equal to 10
   i) In one example, if the Local Illumination Compensation (LIC) flag of the merge candidate is true, the reference samples of the template are derived with LIC method.
   (ii) The cost may be calculated based on the sum of absolute differences (SAD) of T and RT.
      a) Alternatively, the cost may be calculated based on the sum of absolute transformed differences (SATD) of T and RT.
      b) Alternatively, the cost may be calculated based on the sum of squared differences (SSD) of T and RT.
      c) Alternatively, the cost may be calculated based on weighted SAD/weighted SATD/ weighted SSD.
   (iii) The cost may consider the continuity (Boundary_SAD) between RT and reconstructed samples adjacently or non-adjacently neighboring to T in addition to the SAD calculated in (ii). For example, reconstructed samples left and/or above adjacently or non-adjacently neighboring to T are considered.
      a) In one example, the cost may be calculated based on SAD and Boundary_SAD
         [1] In one example, the cost may be calculated as (SAD+w*Boundary_SAD). w may be predefined, or signaled or derived according to decoded information.
2. Whether to and/or how to reorder the merge candidates may depend on the category of the merge candidates.
   a. In one example, only adjacent spatial and temporal merge candidates can be reordered.
   b. In one example, only adjacent spatial, STMVP, and temporal merge candidates can be reordered.
   c. In one example, only adjacent spatial, STMVP, temporal and non-adjacent spatial merge candidates can be reordered.
   d. In one example, only adjacent spatial, STMVP, temporal, non-adjacent spatial and HMVP merge candidates can be reordered.
   e. In one example, only adjacent spatial, STMVP, temporal, non-adjacent spatial, HMVP and pair-wise average merge candidates can be reordered.

f. In one example, only adjacent spatial, temporal, HMVP and pair-wise average merge candidates can be reordered.
g. In one example, only adjacent spatial, temporal, and HMVP merge candidates can be reordered.
h. In one example, only adjacent spatial merge candidates can be reordered.
i. In one example, only the first subgroup can be reordered.
j. In one example, the last subgroup can not be reordered.
k. In one example, only the first N merge candidates can be reordered.
  i. In one example, N is set equal to 5.
l. In one example, for the candidates not to be reordered, they will be arranged in the merge candidate list according to the initial order.
m. In one example, candidates not to be reordered may be put behind the candidates to be reordered.
n. In one example, candidates not to be reordered may be put before the candidates to be reordered.
o. In one example, a combination of some of the above items (a~k) can be reordered.
p. Different subgroups may be reordered separately.
q. Two candidates in different subgroups cannot be compared and/or reordered.
r. A first candidate in a first subgroup must be put ahead of a second candidate in a second subgroup after reordering if the first subgroup is ahead of a second subgroup.

3. Whether to and/or how to reorder the merge candidates may depend on the coding mode.
  a. In one example, if the coding mode is regular merge mode, the merge candidates can be reordered.
  b. In one example, if the coding mode is MMVD, the merge candidates to derive the base merge candidates are not reordered.
    i. Alternatively, the reordering method may be different for the MMVD mode and other merge modes.
  c. In one example, if the coding mode is CIIP, the merge candidates used for combination with intra prediction are based on the reordered merge candidates.
    i. Alternatively, the reordering method may be different for the CIIP mode and other merge modes.
  d. In one example, if the coding mode is GPM, the merge candidates to derive the uni-prediction candidate list are not reordered.
    i. Alternatively, the reordering method may be different for the GPM mode and other merge modes.
  e. In one example, if the coding mode is a triangle partition mode, the merge candidates to derive the uni-prediction candidate list are not reordered.
    i. Alternatively, the reordering method may be different for the triangular mode and other merge modes.
  f. In one example, if the coding mode is a subblock based merge mode, partial or full subblock based merge candidates are reordered.
    i. Alternatively, the reordering method may be different for the subblock based merge mode and other merge modes
    ii. In one example, the uni-prediction subblock based merge candidates are not reordered.
    iii. In one example, the SbTMVP candidate is not reordered.
    iv. In one example, the constructed affine candidates are not reordered.
    v. In one example, the zero padding affine candidates are not reordered.
      Whether to and/or how to reorder the merge candidates may depend on the available number of adjacent spatial and/or STMVP and/or temporal merge candidates 4. Whether the merge candidates need to be reordered or not may depend on decoded information (e.g., the width and/or height of the CU).
  a. In one example, if the height is larger than or equal to M, the width is larger than or equal to N, and width*height is larger than or equal to R, the merge candidates can be reordered.
    i. In one example, M, N, and R are set equal to 8, 8, and 128.
    ii. In one example, M, N, and R are set equal to 16, 16, and 512.
  b. In one example, if the height is larger than or equal to M and the width is larger than or equal to N, the merge candidates can be reordered.
    i. In one example, M and N are set equal to 8 and 8.
    ii. In one example, M and N are set equal to 16 and 16.

5. The subgroup size can be adaptive.
  a. In one example, the subgroup size is decided according to the available number of adjacent spatial and/or STMVP and/or temporal merge candidates denoted as N.
    i. In one example, if N is smaller than M and larger than Q, the subgroup size is set to N;
    ii. In one example, if N is smaller than or equal to Q, no reordering is performed;
    iii. In one example, if N is larger than or equal to M, the subgroup size is set to M.
    iv. In one example, M and Q are set equal to 5 and 1, respectively.
      (i) Alternatively, M and/or Q may be pre-defined, or signaled or derived according to decoded information.
  b. In one example, the subgroup size is decided according to the available number of adjacent spatial and temporal merge candidates denoted as N.
    i. In one example, if N is smaller than M and larger than Q, the subgroup size is set to N;
    ii. In one example, if N is smaller than or equal to Q, no reorder is performed;
    iii. In one example, if N is larger than or equal to M, the subgroup size is set to M.
    iv. In one example, M and Q are set equal to 5 and 1, respectively.

6. The template shape can be adaptive.
  a. In one example, the template may only comprise neighboring samples left to the current block.
  b. In one example, the template may only comprise neighboring samples above to the current block.
  c. In one example, the template shape is selected according to the CU shape.
  d. In one example, the width of the left template is selected according to the CU height.
    i. For example, if $H<=M$, then the left template size is w1×H; otherwise, the left template size is w2×H.
  e. In one example, M, w1, and w2 are set equal to 8, 1, and 2, respectively.

f. In one example, the height of the above template is selected according to the CU width.
    i. For example, if W<=N, then the above template size is W×h1; otherwise, the above template size is W×h2.
        (i) In one example, N, h1, and h2 are set equal to 8, 1, and 2, respectively.
g. In one example, the width of the left template is selected according to the CU width.
    i. For example, if W<=N, then the left template size is w1×H; otherwise, the left template size is w2×H.
        (i) In one example, N, w1, and w2 are set equal to 8, 1, and 2, respectively.
h. In one example, the height of the above template is selected according to the CU height.
    i. For example, if H<=M, then the above template size is W×h1; otherwise, the above template size is W×h2.
        (i) In one example, M, h1, and h2 are set equal to 8, 1, and 2, respectively.
i. In one example, samples of the template and the reference samples of the template samples may be subsampled or downsampled before being used to calculate the cost.
    i. Whether to and/or how to do subsampling may depend on the CU dimensions.
    ii. In one example, no subsampling is performed for the short side of the CU.
7. In above examples, the merge candidate is one candidate which is included in the final merge candidate list (e.g., after pruning)
    a. Alternatively, the merge candidate is one candidate derived from a given spatial or temporal block or HMVP table or with other ways even it may not be included in the final merge candidate list.
8. The template may comprise samples of specific color component(s).
    a. In one example, the template only comprises samples of the luma component.
9. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

We can assume the number of the merge candidates is 8. We take the first 5 merge candidates as a first subgroup and take the following 3 merge candidates as a second subgroup (i.e. the last subgroup).

For the encoder, after the merge candidate list is constructed, some merge candidates are adaptively reordered in an ascending order of costs of merge candidates.

More specifically, the template matching costs for the merge candidates in all subgroups except the last subgroup are computed; then reorder the merge candidates in their own subgroups except the last subgroup; finally, the final merge candidate list will be got. For the decoder, after the merge candidate list is constructed, some/no merge candidates are adaptively reordered in ascending order of costs of merge candidates. The subgroup the selected (signaled) merge candidate located in is called the selected subgroup.

More specifically, if the selected merge candidate is located in the last subgroup, the merge candidate list construction process is terminated after the selected merge candidate is derived, no reorder is performed and the merge candidate list is not changed; otherwise, the execution process is as follows:

The merge candidate list construction process is terminated after all the merge candidates in the selected subgroup are derived; compute the template matching costs for the merge candidates in the selected subgroup; reorder the merge candidates in the selected subgroup; finally, a new merge candidate list will be got.

For both encoder and decoder,

A template matching cost is derived as a function of T and RT, wherein T is a set of samples in the template and RT is a set of reference samples for the template.

When deriving the reference samples of the template for a merge candidate, the motion vectors of the merge candidate are rounded to the integer pixel accuracy.

The reference samples of the template (RT) for bi-directional prediction are derived by weighted averaging of the reference samples of the template in reference list0 ($RT_0$) and the reference samples of the template in reference list1 ($RT_1$) as follows.

$$RT = ((8-w)*RT_0 + w*RT_1 + 4) >> 3$$

where the weight of the reference template in reference list0 (8−w) and the weight of the reference template in reference list1 (w) are decided by the BCW index of the merge candidate. BCW index equal to {0, 1, 2, 3, 4} corresponds to w equal to {−2, 3, 4, 5, 10}, respectively.

If the Local Illumination Compensation (LIC) flag of the merge candidate is true, the reference samples of the template are derived with LIC method.

The template matching cost is calculated based on the sum of absolute differences (SAD) of T and RT.

The template size is 1. That means the width of the left template and/or the height of the above template is 1.

If the coding mode is MMVD, the merge candidates to derive the base merge candidates are not reordered.

If the coding mode is GPM, the merge candidates to derive the uni-prediction candidate list are not reordered.

We claim:

1. A method of coding video data, comprising:
    determining, during a conversion between a current video block of a video and a bitstream of the video, a group type of a subgroup of candidates of motion information for the current video block, the group type indicating whether the subgroup of candidates are to be reordered;
    constructing a list of candidates based on the group type; and
    deriving the motion information for the current video block from the list of candidates.

2. The method of claim 1, wherein the conversion comprises decoding the current video block from the bitstream.

3. The method of claim 1, wherein the group type is indicated in the bitstream using an index for the motion information.

4. The method of claim 3, wherein the index for the motion information is signaled in the bitstream if the coding mode is not one of the following coding modes:
    a merge mode with motion vector differences (MMVD) mode,
    a geometric partitioning mode (GPM), a triangle partition mode, or
    a sub-block based merge mode.

5. The method of claim 3, wherein the index for the motion information is signaled in the bitstream if at least one of the following conditions is satisfied:
- a height of the current video block is greater than or equal to a first threshold,
- a width of the current video block is greater than or equal to a second threshold, or
- a product of the height and the width of the current video block is greater than or equal to a third threshold.

6. The method of claim 3, wherein the index is decoded from the bitstream if a first flag decoded from the bitstream has a first value.

7. The method of claim 1, wherein a second flag indicating the group type is signaled in the bitstream.

8. The method of claim 1, wherein constructing the list of candidates comprises:
- if the group type indicates that the subgroup of candidates are to be reordered, reordering the subgroup of candidates to obtain a reordered subgroup; and
- constructing the list of candidates based on the reordered subgroup.

9. The method of claim 8, wherein the subgroup of candidates are reordered based on a template matching cost associated with each of the subgroup of candidates, the template matching cost being determined based on a first difference between a set of neighboring samples of the current video block and a set of reference samples corresponding to the set of neighboring samples, the set of reference samples being determined based on motion information indicated by a respective candidate.

10. The method of claim 9, wherein the set of neighboring samples consists of samples of the luminance component.

11. The method of claim 9, wherein a shape of the set of neighboring samples is determined based on a shape of the current video block.

12. The method of claim 9, wherein the first difference is determined based on a down-sampled version of the set of neighboring samples and a down-sampled version of the set of reference samples.

13. The method of claim 9, wherein the motion information comprises a motion vector, and wherein the motion vector is adjusted to integer pixel accuracy for determining the set of reference samples.

14. The method of claim 9, wherein the set of reference samples are determined based on one of: a 2-tap interpolation process, a 4-tap interpolation process, a 6-tap interpolation process or 8-tap interpolation process.

15. The method of claim 9, wherein the motion information comprise a first motion vector in a first direction and a second motion vector in a second direction, and wherein the set of reference samples is determined based on a weighted sum of a first set of reference samples and a second set of reference samples, the first set of reference samples being determined based on the first motion vector, and the second set of reference samples being determined based on the second motion vector.

16. The method of claim 15, wherein the first set of reference samples are associated with a first weight and the second set of reference samples are associated with a second weight, and wherein at least one of the first weight and the second weight is determined according to a Bi-prediction with CU-level weight (BCW) index associated with the respective candidate.

17. The method of claim 9, wherein the first difference comprises at least one of:
- a sum of absolute differences (SAD),
- a sum of absolute transformed differences (SATD),
- a sum of squared differences (SSD),
- a weighted SAD,
- a weighted SATD, or
- a weighted SSD.

18. The method of claim 9, wherein the template matching cost is determined based on a weighted sum of the first difference and a second difference, the second difference being determined based on a set of reconstructed samples neighboring to the set of neighboring samples and the set of reference samples.

19. The method of claim 18, wherein the template matching cost comprises a weighted sum of the first difference and the second difference.

20. The method of claim 19, wherein at least one of a third weight associated with the first difference and a fourth weight associated with the second difference is obtained from the bitstream.

21. The method of claim 8, wherein at least one of the following candidates is not be reordered during the reordering the subgroup of candidates:
- a uni-prediction sub-block based merge candidate,
- a subblock-based temporal motion vector prediction (SbTMVP) candidate,
- a constructed affine candidate, or
- a zero padding affine candidate.

22. The method of claim 8, wherein:
- if the subgroup of candidates comprise a first candidate associated with a block above the current video block and a second candidate associated with a block on the left of the current video block, the first candidate and the second candidate are reordered according to a comparison between a height and a width of the current video block during the reordering the subgroup of candidates.

23. The method of claim 3, wherein constructing the list of candidates based on the group type comprises:
- if the group type indicates that the subgroup of candidates are to be reordered, constructing the list of candidates based on the index such that all of the subgroup of candidates are included in the list of candidates.

24. The method of claim 3, wherein constructing the list of candidates based on the group type comprising:
- if the group type indicates that the subgroup of candidates are not to be reordered, constructing the list of candidates according to a predetermined order based on the index.

25. The method of claim 1, wherein determining the group type of the subgroup of candidates comprises:
- if a sequence number associated with the subgroup among a plurality of subgroups is greater than a threshold, determining the group type as a first type indicating that the subgroup of candidates are to be reordered; or
- if a sequence number associated with the subgroup among the plurality of subgroups is less than or equal to the threshold, determining the group type as a second type indicating that the subgroup of candidates are not to be reordered.

26. The method of claim 25, wherein a size of at least one of the plurality of subgroups is determined based on at least one of:
- a number of available adjacent spatial merge candidates,
- a number of available spatial temporal motion vector prediction (STMVP) merge candidates,
- a number of available temporal merge candidates,
- a number of available non-adjacent spatial merge candidates,
- a number of available HMVP merge candidates, or a number of available pair-wise average merge candidates.

27. The method of claim 1, wherein the conversion comprises encoding the current video block into the bitstream.

28. An electronic device, comprising:
a processing unit; and
a memory coupled to the processing unit and having instructions stored thereon which, when executed by the processing unit, cause the electronic device to:
determine, during a conversion between a current video block of a video and a bitstream of the video, a group type of a subgroup of candidates of motion information for the current video block, the group type indicating whether the subgroup of candidates are to be reordered;
construct a list of candidates based on the group type; and
derive the motion information for the current video block from the list of candidates.

29. A non-transitory computer-readable storage medium storing instructions that cause a processor to:
determine, during a conversion between a current video block of a video and a bitstream of the video, a group type of a subgroup of candidates of motion information for the current video block, the group type indicating whether the subgroup of candidates are to be reordered;
construct a list of candidates based on the group type; and
derive the motion information for the current video block from the list of candidates.

30. A non-transitory computer-readable recording medium storing a bitstream of a video which is generated by a method performed by a video processing apparatus, wherein the method comprises:
determining, during a conversion between a current video block of a video and a bitstream of the video, a group type of a subgroup of candidates of motion information for the current video block, the group type indicating whether the subgroup of candidates are to be reordered;
constructing a list of candidates based on the group type; and
deriving the motion information for the current video block from the list of candidates.

* * * * *